(12) United States Patent
Gass

(10) Patent No.: US 7,347,131 B2
(45) Date of Patent: Mar. 25, 2008

(54) MITER SAW WITH IMPROVED SAFETY SYSTEM

(75) Inventor: Stephen F. Gass, Wilsonville, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 11/445,548

(22) Filed: Jun. 2, 2006

(65) Prior Publication Data

US 2006/0230896 A1    Oct. 19, 2006

Related U.S. Application Data

(63) Continuation of application No. 11/401,774, filed on Apr. 11, 2006, and a continuation of application No.

(Continued)

(60) Provisional application No. 60/667,485, filed on Sep. 29, 2005, provisional application No. 60/540,377, (Continued)

(51) Int. Cl.
*B23D 45/04* (2006.01)
*B27B 3/28* (2006.01)

(52) U.S. Cl. ................. 83/58; 83/62.1; 83/397.1; 83/471.2; 83/471.3; 83/478; 83/490; 83/581

(58) Field of Classification Search ......... 83/477.1, 83/397.1, DIG. 1, 581, 666, 62.1, 72, 471.3, 83/62, 473, 488, 490, 58, 76.7, 481, 471.2, 83/478, 485, 487, 489, 574, 821, 823, 827, 83/828, 954, 665, 522, 11, 22, 544, 476, 491, 83/526, 76.8, 546, 477.2, 781, 639.1, 397, 83/477, 74; 30/380, 381, 373, 370, 371, 30/390; 451/1, 6, 9, 119, 158, 177; 144/382, 144/356, 154, 365, 117.1, 118; 241/37.5; 125/13.01

See application file for complete search history.

(56) References Cited

U.S. PATENT DOCUMENTS

| 146,886 A | 1/1874 | Doane et al. |
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |

(Continued)

FOREIGN PATENT DOCUMENTS

CA    2140991    1/1995

(Continued)

OTHER PUBLICATIONS

Skil Model 3400-Type 1 10Table Saw Parts List and Technical Bulletin, S-B Power Tool Company, Jun. 1993.

(Continued)

*Primary Examiner*—Ghassem Alie

(57) ABSTRACT

A miter saw is disclosed having a base, a blade supported by the base, a detection system adapted to detect a dangerous condition between a person and the blade, and a reaction system associated with the detection system to cause a predetermined action to take place upon detection of the dangerous condition. The blade is rotatable, and moves into a cutting zone to cut a workpiece. The predetermined action may be to stop the blade from rotating, to create an impulse against movement of the blade into the cutting zone, or to cause the blade to move away from the cutting zone.

20 Claims, 9 Drawing Sheets

Related U.S. Application Data

(63) 11/401,050, filed on Apr. 10, 2006, and a continuation of application No. 11/395,502, filed on Mar. 31, 2006, and a continuation of application No. 11/353,423, filed on Feb. 13, 2006, and a continuation of application No. 11/348,580, filed on Feb. 6, 2006, now abandoned, and a continuation of application No. 11/256,757, filed on Oct. 24, 2005, and a continuation of application No. 11/208,214, filed on Aug. 19, 2005, and a continuation of application No. 11/190,111, filed on Jul. 25, 2005, and a continuation of application No. 11/107,499, filed on Apr. 15, 2005, and a continuation of application No. 11/098,984, filed on Apr. 4, 2005, and a continuation of application No. 11/061,162, filed on Feb. 18, 2005, and a continuation of application No. 11/027,600, filed on Dec. 31, 2004, which is a continuation of application No. 11/027,322, filed on Dec. 31, 2004, now abandoned, and a continuation of application No. 11/027,254, filed on Dec. 31, 2004, and a continuation of application No. 11/026,114, filed on Dec. 31, 2004, and a continuation of application No. 11/026,006, filed on Dec. 31, 2004, and a continuation of application No. 10/984,643, filed on Nov. 8, 2004, and a continuation of application No. 10/932,339, filed on Sep. 1, 2004, and a continuation of application No. 10/923,290, filed on Aug. 20, 2004, and a continuation of application No. 10/923,282, filed on Aug. 20, 2004, now abandoned, and a continuation of application No. 10/923,273, filed on Aug. 20, 2004, and a continuation of application No. 10/794,161, filed on Mar. 4, 2004, now Pat. No. 7,098,800, which is a continuation of application No. 10/785,361, filed on Feb. 23, 2004, now Pat. No. 6,997,090, and a continuation of application No. 10/643,296, filed on Aug. 18, 2003, and a continuation of application No. 10/345,630, filed on Jan. 15, 2003, and a continuation of application No. 10/341,260, filed on Jan. 13, 2003, and a continuation of application No. 10/292,607, filed on Nov. 12, 2002, now Pat. No. 7,077,039, which is a continuation of application No. 10/251,576, filed on Sep. 20, 2002, now abandoned, and a continuation of application No. 10/243,042, filed on Sep. 13, 2002, now Pat. No. 7,197,969, which is a continuation of application No. 10/215,929, filed on Aug. 9, 2002, now abandoned, which is a continuation of application No. 10/205,164, filed on Jul. 25, 2002, now Pat. No. 6,945,149, and a continuation of application No. 10/202,928, filed on Jul. 25, 2002, now Pat. No. 7,000,514, which is a continuation-in-part of application No. 10/197,975, filed on Jul. 18, 2002, now abandoned, and a continuation of application No. 10/189,031, filed on Jul. 2, 2002, now Pat. No. 7,171,879, and a continuation of application No. 10/189,027, filed on Jul. 2, 2002, and a continuation of application No. 10/172,553, filed on Jun. 13, 2002, and a continuation of application No. 10/146,527, filed on May 15, 2002, and a continuation of application No. 10/100,211, filed on Mar. 13, 2002, and a continuation of application No. 10/053,390, filed on Jan. 16, 2002, and a continuation of application No. 10/052,806, filed on Jan. 16, 2002, now Pat. No. 6,880,440, which is a continuation of application No. 10/052,705, filed on Jan. 16, 2002, now Pat. No. 6,994,004, and a continuation of application No. 10/051,782, filed on Jan. 15, 2002, now Pat. No. 6,877,410, and a continuation of application No. 10/050,085, filed on Jan. 14, 2002, now abandoned, which is a continuation of application No. 10/047,066, filed on Jan. 14, 2002, now Pat. No. 6,945,148, which is a continuation of application No. 09/955,418, filed on Sep. 17, 2001, now Pat. No. 6,957,601, which is a continuation of application No. 09/929,426, filed on Aug. 13, 2001, now Pat. No. 7,210,383, and a continuation of application No. 09/929,425, filed on Aug. 13, 2001, now Pat. No. 7,137,326, which is a continuation of application No. 09/929,244, filed on Aug. 13, 2001, now Pat. No. 6,857,345, and a continuation of application No. 09/929,242, filed on Aug. 13, 2001, which is a continuation of application No. 09/929,241, filed on Aug. 13, 2001, now Pat. No. 7,024,975, and a continuation of application No. 09/929,240, filed on Aug. 13, 2001, now Pat. No. 7,100,483, and a continuation of application No. 09/929,238, filed on Aug. 13, 2001, and a continuation of application No. 09/929,237, filed on Aug. 13, 2001, and a continuation of application No. 09/929,236, filed on Aug. 13, 2001, and a continuation of application No. 09/929,235, filed on Aug. 13, 2001, and a continuation of application No. 09/929,234, filed on Aug. 13, 2001, and a continuation of application No. 09/929,227, filed on Aug. 13, 2001, and a continuation of application No. 09/929,226, filed on Aug. 13, 2001, now Pat. No. 6,920,814, and a continuation of application No. 09/929,221, filed on Aug. 13, 2001, and a continuation of application No. 09/676,190, filed on Sep. 29, 2000, now Pat. No. 7,055,417.

(60) filed on Mar. 31, 2005, provisional application No. 60/533,852, filed on Dec. 31, 2003, provisional application No. 60/533,811, filed on Dec. 31, 2003, provisional application No. 60/533,791, filed on Dec. 31, 2003, provisional application No. 60/533,598, filed on Dec. 31, 2003, provisional application No. 60/533,575, filed on Dec. 31, 2003, provisional application No. 60/496,574, filed on Aug. 20, 2003, provisional application No. 60/496,568, filed on Aug. 20, 2003, provisional application No. 60/496,550, filed on Aug. 20, 2003, provisional application No. 60/452,159, filed on Mar. 5, 2003, provisional application No. 60/406,138, filed on Aug. 27, 2002, provisional application No. 60/351,797, filed on Jan. 25, 2002, provisional application No. 60/349,989, filed on Jan. 16, 2002, provisional application No. 60/335,970, filed on Nov. 13, 2001, provisional application No. 60/324,729, filed on Sep. 24, 2001, provisional application No. 60/323,975, filed on Sep. 21, 2001, provisional application No. 60/312,141, filed on Aug. 13, 2001, provisional application No. 60/308,492, filed on Jul. 27, 2001, provisional application No. 60/307,756, filed on Jul. 25, 2001, provisional application No. 60/306,202, filed on Jul. 18, 2001, provisional application No. 60/302,916, filed on Jul. 3, 2001, provisional application No. 60/302,937, filed on Jul. 2, 2001, provisional application No. 60/292,100, filed on May 17, 2001, provisional application No. 60/292,081, filed on May 17, 2001, provisional application No. 60/279,313, filed on Mar. 27, 2001, provisional application No. 60/275,595, filed on Mar. 17, 2001, provisional application No. 60/275,594, filed on Mar. 13, 2001, provisional application No. 60/273,902, filed on Mar. 6, 2001, provisional application No. 60/273,178, filed on Mar. 2, 2001, provisional application No. 60/273,177, filed on Mar. 2, 2001, provisional application No. 60/270,942, filed on Feb. 22, 2001, provisional application No. 60/270,941, filed on Feb. 22, 2001, provisional application No. 60/270,011, filed on Feb. 20, 2001, provisional application No. 60/233,459, filed on Sep. 18, 2000, provisional application No. 60/225,212, filed on Aug. 14, 2000, provisional application No. 60/225,211, filed on Aug. 14, 2000, provisional application No. 60/225,210, filed on Aug. 14, 2000, provisional application No. 60/225,206, filed on Aug. 14, 2000, provisional application No. 60/225,201, filed on Aug. 14, 2000, provisional application No. 60/225,200, filed on Aug. 14, 2000, provisional application No. 60/225,170, filed on Aug. 14, 2000, provisional application No. 60/225,169, filed on Aug. 14, 2000, provisional application No. 60/225,094, filed on Aug. 14, 2000, provisional application No. 60/225,089, filed on Aug. 14, 2000, provisional application No. 60/225,059, filed on Aug. 14, 2000, provisional application No. 60/225,058, filed on Aug. 14, 2000, provisional application No. 60/225,057, filed on Aug. 14, 2000, provisional application No. 60/225,056, filed on Aug. 14, 2000, provisional application No. 60/182,866, filed on Feb. 16, 2000, provisional application No. 60/157,340, filed on Oct. 1, 1999.

(56) References Cited

U.S. PATENT DOCUMENTS

| | | |
|---|---|---|
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 6/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Dummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Dummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 2/1948 | McWhirter et al. |
| 2,466,325 A | 4/1949 | Ocenasek |
| 2,496,613 A | 2/1950 | Wooward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A * | 10/1955 | Gjerde ..................... 83/471.3 |
| 2,722,246 A | 11/1955 | Arnoldy |

| | | | | | | |
|---|---|---|---|---|---|---|
| 2,731,049 A | 1/1956 | Akin | | 3,696,844 A | 10/1972 | Bernatschek |
| 2,736,348 A | 2/1956 | Nelson | | 3,716,113 A | 2/1973 | Kobayashi et al. |
| 2,737,213 A | 3/1956 | Richards et al. | | 3,719,103 A | 3/1973 | Streander |
| 2,758,615 A | 8/1956 | Mastriforte | | 3,740,000 A | 6/1973 | Takada |
| 2,785,710 A | 3/1957 | Mowery, Jr. | | 3,745,546 A | 7/1973 | Struger et al. |
| 2,786,496 A | 3/1957 | Eschenburg | | 3,749,933 A | 7/1973 | Davidson |
| 2,804,890 A | 9/1957 | Fink | | 3,754,493 A | 8/1973 | Niehaus et al. |
| 2,810,408 A | 10/1957 | Boice et al. | | 3,772,590 A | 11/1973 | Mikulecky et al. |
| 2,839,943 A | 6/1958 | Caldwell et al. | | 3,785,230 A | 1/1974 | Lokey |
| 2,844,173 A | 7/1958 | Gaskell | | 3,793,915 A | 2/1974 | Huier |
| 2,850,054 A | 9/1958 | Eschenburg | | 3,805,639 A | 4/1974 | Peter |
| 2,852,047 A | 9/1958 | Odlum et al. | | 3,805,658 A | 4/1974 | Scott et al. |
| 2,873,773 A | 2/1959 | Gaskell | | 3,808,932 A | 5/1974 | Russell |
| 2,876,809 A | 3/1959 | Rentsch et al. | | 3,829,850 A | 8/1974 | Guetersloh |
| 2,883,486 A | 4/1959 | Mason | | 3,829,970 A | 8/1974 | Anderson |
| 2,894,546 A | 7/1959 | Eschenburg | | 3,858,095 A | 12/1974 | Friemann et al. |
| 2,913,025 A | 11/1959 | Richards | | 3,861,016 A | 1/1975 | Johnson et al. |
| 2,913,581 A | 11/1959 | Simonton et al. | | 3,863,208 A | 1/1975 | Balban |
| 2,937,672 A | 5/1960 | Gjerde | | 3,874,747 A | 4/1975 | Case et al. |
| 2,945,516 A | 7/1960 | Edgemond, Jr. et al. | | 3,880,032 A | 4/1975 | Green |
| 2,954,118 A | 9/1960 | Anderson | | 3,882,744 A | 5/1975 | McCarroll |
| 2,957,166 A | 10/1960 | Ghick | | 3,886,413 A | 5/1975 | Dow et al. |
| 2,978,084 A | 4/1961 | Vilkaitis | | 3,889,567 A | 6/1975 | Sato et al. |
| 2,984,268 A | 5/1961 | Vuichard | | 3,905,263 A | 9/1975 | Smith |
| 2,991,593 A | 7/1961 | Cohen | | 3,922,785 A | 12/1975 | Fushiya |
| 3,005,477 A | 10/1961 | Sherwen | | 3,924,688 A | 12/1975 | Cooper et al |
| 3,011,529 A | 12/1961 | Copp | | 3,931,727 A | 1/1976 | Luenser |
| 3,011,610 A | 12/1961 | Stiebel et al. | | 3,935,777 A | 2/1976 | Bassett |
| 3,013,592 A | 12/1961 | Ambrosio et al. | | 3,945,286 A | 3/1976 | Smith |
| 3,021,881 A | 2/1962 | Edgemond, Jr. et al. | | 3,946,631 A | 3/1976 | Malm |
| 3,035,995 A | 5/1962 | Seeley et al. | | 3,947,734 A | 3/1976 | Fyler |
| 3,047,116 A | 7/1962 | Stiebel et al. | | 3,949,636 A | 4/1976 | Ball et al. |
| 3,085,602 A | 4/1963 | Gaskell | | 3,953,770 A | 4/1976 | Hayashi |
| 3,105,530 A | 10/1963 | Peterson | | 3,960,310 A | 6/1976 | Nussbaum |
| 3,129,731 A | 4/1964 | Tyrrell | | 3,967,161 A | 6/1976 | Lichtblau |
| 3,163,732 A | 12/1964 | Abbott | | 3,974,565 A | 8/1976 | Ellis |
| 3,184,001 A | 5/1965 | Reinsch et al. | | 3,975,600 A | 8/1976 | Marston |
| 3,186,256 A | 6/1965 | Reznick | | 3,978,624 A | 9/1976 | Merkel et al. |
| 3,207,273 A | 9/1965 | Jurin | | 3,994,192 A | 11/1976 | Faig |
| 3,213,731 A | 10/1965 | Renard | | 4,007,679 A | 2/1977 | Edwards |
| 3,224,474 A | 12/1965 | Bloom | | 4,016,490 A | 4/1977 | Weckenmann et al. |
| 3,232,326 A | 2/1966 | Speer et al. | | 4,026,174 A | 5/1977 | Fierro |
| 3,246,205 A | 4/1966 | Miller | | 4,026,177 A | 5/1977 | Lokey |
| 3,249,134 A | 5/1966 | Vogl et al. | | 4,029,159 A | 6/1977 | Nymann |
| 3,274,876 A | 9/1966 | Debus | | 4,047,156 A | 9/1977 | Atkins |
| 3,276,497 A | 10/1966 | Heer | | 4,048,886 A | 9/1977 | Zettler |
| 3,306,149 A | 2/1967 | John | | 4,060,160 A | 11/1977 | Lieber |
| 3,313,185 A | 4/1967 | Drake et al. | | 4,063,777 A * | 12/1977 | Takada ...................... 297/477 |
| 3,315,715 A | 4/1967 | Mytinger | | 4,070,940 A | 1/1978 | McDaniel et al. |
| 3,323,814 A | 6/1967 | Phillips | | 4,075,961 A | 2/1978 | Harris |
| 3,337,008 A | 8/1967 | Trachte | | 4,077,161 A | 3/1978 | Wyle et al. |
| 3,356,111 A | 12/1967 | Mitchell | | 4,085,303 A | 4/1978 | McIntyre et al. |
| 3,368,596 A | 2/1968 | Corner | | 4,090,345 A | 5/1978 | Harkness |
| 3,386,322 A | 6/1968 | Stone et al. | | 4,091,698 A | 5/1978 | Obear et al. |
| 3,439,183 A | 4/1969 | Hurst, Jr. | | 4,106,378 A | 8/1978 | Kaiser |
| 3,445,835 A | 5/1969 | Fudaley | | 4,117,752 A | 10/1978 | Yoneda |
| 3,454,286 A | 7/1969 | Anderson et al. | | 4,145,940 A | 3/1979 | Woloveke et al. |
| 3,456,696 A | 7/1969 | Gregory et al. | | 4,152,833 A | 5/1979 | Phillips |
| 3,512,440 A | 5/1970 | Frydmann | | 4,161,649 A | 7/1979 | Klos et al. |
| 3,538,964 A | 11/1970 | Warrick et al. | | 4,175,452 A | 11/1979 | Idel |
| 3,540,338 A | 11/1970 | McEwan et al. | | 4,184,394 A | 1/1980 | Gjerde |
| 3,554,067 A | 1/1971 | Scutella | | 4,190,000 A | 2/1980 | Shaull et al. |
| 3,566,996 A | 3/1971 | Crossman | | 4,195,722 A | 4/1980 | Anderson et al. |
| 3,580,376 A | 5/1971 | Loshbough | | 4,199,930 A | 4/1980 | Lebet et al. |
| 3,581,784 A | 6/1971 | Warrick | | 4,206,666 A | 6/1980 | Ashton |
| 3,593,266 A | 7/1971 | Van Sickle | | 4,206,910 A | 6/1980 | Biesemeyer |
| 3,613,748 A | 10/1971 | De Pue | | 4,249,117 A | 2/1981 | Leukhardt et al. |
| 3,621,894 A | 11/1971 | Niksich | | 4,249,442 A | 2/1981 | Fittery |
| 3,670,788 A | 6/1972 | Pollak et al. | | 4,262,278 A | 4/1981 | Howard et al. |
| 3,675,444 A | 7/1972 | Whipple | | 4,267,914 A | 5/1981 | Saar |
| 3,680,609 A | 8/1972 | Menge | | 4,270,427 A | 6/1981 | Colberg et al. |
| 3,688,815 A | 9/1972 | Ridenour | | 4,276,459 A | 6/1981 | Willett et al. |
| 3,695,116 A | 10/1972 | Baur | | 4,276,799 A | 7/1981 | Muehling |

| | | |
|---|---|---|
| 4,291,794 A | 9/1981 | Bauer |
| 4,305,442 A | 12/1981 | Currie |
| 4,319,146 A | 3/1982 | Wires, Sr. |
| 4,321,841 A | 3/1982 | Felix |
| 4,334,450 A | 6/1982 | Benuzzi |
| 4,372,202 A | 2/1983 | Cameron |
| 4,374,552 A | 2/1983 | Dayen |
| 4,385,539 A | 5/1983 | Meyerhoefer et al. |
| 4,391,358 A | 7/1983 | Haeger |
| 4,418,597 A | 12/1983 | Krusemark et al. |
| 4,427,042 A | 1/1984 | Mitchell et al. |
| 4,466,170 A | 8/1984 | Davis |
| 4,466,233 A | 8/1984 | Thesman |
| 4,470,046 A | 9/1984 | Betsill |
| 4,492,291 A | 1/1985 | Chometon et al. |
| 4,503,739 A | 3/1985 | Konieczka |
| 4,510,489 A | 4/1985 | Anderson, III et al. |
| 4,512,224 A | 4/1985 | Terauchi |
| 4,518,043 A | 5/1985 | Anderson et al. |
| 4,532,501 A | 7/1985 | Hoffman |
| 4,532,844 A | 8/1985 | Chang et al. |
| 4,557,168 A | 12/1985 | Tokiwa |
| 4,559,858 A | 12/1985 | Laskowski et al. |
| 4,560,033 A | 12/1985 | DeWoody et al. |
| 4,566,512 A | 1/1986 | Wilson |
| 4,573,556 A | 3/1986 | Andreasson |
| 4,576,073 A | 3/1986 | Stinson |
| 4,589,047 A | 5/1986 | Gaus et al. |
| 4,589,860 A | 5/1986 | Brandenstein et al. |
| 4,599,597 A | 7/1986 | Rotbart |
| 4,599,927 A | 7/1986 | Eccardt et al. |
| 4,606,251 A | 8/1986 | Boileau |
| 4,615,247 A | 10/1986 | Berkeley |
| 4,621,300 A | 11/1986 | Summerer |
| 4,625,604 A | 12/1986 | Handler et al. |
| 4,637,188 A | 1/1987 | Crothers |
| 4,637,289 A | 1/1987 | Ramsden |
| 4,644,832 A | 2/1987 | Smith |
| 4,653,189 A | 3/1987 | Andreasson |
| 4,657,428 A | 4/1987 | Wiley |
| 4,661,797 A | 4/1987 | Schmall |
| 4,672,500 A | 6/1987 | Tholome et al. |
| 4,675,664 A | 6/1987 | Cloutier et al. |
| 4,679,719 A | 7/1987 | Kramer |
| 4,718,229 A | 1/1988 | Riley |
| 4,722,021 A | 1/1988 | Hornung et al. |
| 4,751,603 A | 6/1988 | Kwan |
| 4,756,220 A | 7/1988 | Olsen et al. |
| 4,757,881 A | 7/1988 | Jonsson et al. |
| 4,774,866 A | 10/1988 | Dehari et al. |
| 4,792,965 A | 12/1988 | Morgan |
| 4,805,504 A | 2/1989 | Fushiya et al. |
| 4,831,279 A | 5/1989 | Ingraham |
| 4,840,135 A | 6/1989 | Yamauchi |
| 4,845,476 A | 7/1989 | Rangeard et al. |
| 4,864,455 A | 9/1989 | Shimomura et al. |
| 4,875,398 A | 10/1989 | Taylor et al. |
| 4,888,869 A | 12/1989 | Leatherman |
| 4,896,607 A | 1/1990 | Hall et al. |
| 4,906,962 A | 3/1990 | Duimstra |
| 4,907,679 A | 3/1990 | Menke |
| 4,934,233 A | 6/1990 | Brundage et al. |
| 4,936,876 A | 6/1990 | Reyes |
| 4,937,554 A | 6/1990 | Herman |
| 4,962,685 A | 10/1990 | Hagstrom |
| 4,964,450 A | 10/1990 | Hughes et al. |
| 4,965,909 A | 10/1990 | McCullough et al. |
| 4,975,798 A | 12/1990 | Edwards et al. |
| 5,020,406 A | 6/1991 | Sasaki et al. |
| 5,025,175 A | 6/1991 | Dubois, III |
| 5,042,348 A | 8/1991 | Brundage et al. |
| 5,046,426 A | 9/1991 | Julien et al. |
| 5,052,255 A | 10/1991 | Gaines |
| 5,074,047 A | 12/1991 | King |
| 5,081,406 A | 1/1992 | Hughes et al. |
| 5,082,316 A | 1/1992 | Wardlaw |
| 5,083,973 A | 1/1992 | Townsend |
| 5,086,890 A | 2/1992 | Turczyn et al. |
| 5,094,000 A | 3/1992 | Becht et al. |
| 5,116,249 A | 5/1992 | Shiotani et al. |
| 5,119,555 A | 6/1992 | Johnson |
| 5,122,091 A | 6/1992 | Townsend |
| 5,146,714 A | 9/1992 | Luber |
| 5,174,349 A | 12/1992 | Svetlik et al. |
| 5,184,534 A | 2/1993 | Lee |
| 5,198,702 A | 3/1993 | McCullough et al. |
| 5,199,343 A | 4/1993 | OBanion |
| 5,201,110 A | 4/1993 | Bane |
| 5,201,684 A | 4/1993 | DeBois, III |
| 5,206,625 A | 4/1993 | Davis |
| 5,207,253 A | 5/1993 | Hoshino et al. |
| 5,212,621 A | 5/1993 | Panter |
| 5,218,189 A | 6/1993 | Hutchison |
| 5,231,359 A | 7/1993 | Masuda et al. |
| 5,231,906 A | 8/1993 | Kogej |
| 5,239,878 A | 8/1993 | Plangetis |
| 5,245,879 A | 9/1993 | McKeon |
| 5,257,570 A | 11/1993 | Shiotani et al. |
| 5,265,510 A | 11/1993 | Hoyer-Ellefsen |
| 5,272,946 A | 12/1993 | McCullough et al. |
| 5,276,431 A | 1/1994 | Piccoli et al. |
| 5,285,708 A | 2/1994 | Bosten et al. |
| 5,293,802 A | 3/1994 | Shiontani et al. |
| 5,320,382 A | 6/1994 | Goldstein et al. |
| 5,321,230 A | 6/1994 | Shanklin et al. |
| 5,331,875 A | 7/1994 | Mayfield |
| 5,353,670 A | 10/1994 | Metzger, Jr. |
| 5,377,554 A | 1/1995 | Reulein et al. |
| 5,377,571 A | 1/1995 | Josephs |
| 5,392,568 A | 2/1995 | Howard, Jr. et al. |
| 5,392,678 A | 2/1995 | Sasaki et al. |
| 5,401,928 A | 3/1995 | Kelley |
| 5,411,221 A | 5/1995 | Collins et al. |
| 5,423,232 A | 6/1995 | Miller et al. |
| 5,436,613 A | 7/1995 | Ghosh et al. |
| 5,447,085 A | 9/1995 | Gochnauer |
| 5,451,750 A | 9/1995 | An |
| 5,453,903 A | 9/1995 | Chow |
| 5,471,888 A | 12/1995 | McCormick |
| 5,480,009 A | 1/1996 | Wieland et al. |
| 5,503,059 A | 4/1996 | Pacholok |
| 5,510,587 A | 4/1996 | Reiter |
| 5,510,685 A | 4/1996 | Grasselli |
| 5,513,548 A | 5/1996 | Garuglieri |
| 5,531,147 A | 7/1996 | Serban |
| 5,534,836 A | 7/1996 | Schenkel et al. |
| 5,572,916 A | 11/1996 | Takano |
| 5,587,618 A | 12/1996 | Hathaway |
| 5,592,353 A | 1/1997 | Shinohara et al. |
| 5,606,889 A | 3/1997 | Bielinski et al. |
| 5,619,896 A | 4/1997 | Chen |
| 5,623,860 A | 4/1997 | Schoene et al. |
| 5,647,258 A | 7/1997 | Brazell et al. |
| 5,648,644 A | 7/1997 | Nagel |
| 5,659,454 A | 8/1997 | Vermesse |
| 5,667,152 A | 9/1997 | Mooring |
| 5,671,633 A | 9/1997 | Wagner |
| 5,695,306 A | 12/1997 | Nygren, Jr. |
| 5,700,165 A | 12/1997 | Harris et al. |
| 5,720,213 A | 2/1998 | Sberveglieri |
| 5,722,308 A | 3/1998 | Ceroll et al. |
| 5,724,875 A | 3/1998 | Meredith et al. |
| 5,730,165 A | 3/1998 | Philipp |
| 5,741,048 A | 4/1998 | Eccleston |
| 5,755,148 A | 5/1998 | Stumpf et al. |
| 5,771,742 A | 6/1998 | Bokaie et al. |

| | | | | | | |
|---|---|---|---|---|---|---|
| 5,782,001 A | 7/1998 | Gray | | 6,536,536 B1 | 3/2003 | Gass et al. |
| 5,787,779 A | 8/1998 | Garuglieri | | 6,543,324 B1 | 4/2003 | Dils |
| 5,791,057 A | 8/1998 | Nakamura et al. | | 6,546,835 B2 | 4/2003 | Wang |
| 5,791,223 A | 8/1998 | Lanzer | | 6,564,909 B1 | 5/2003 | Razzano |
| 5,791,224 A | 8/1998 | Suzuki et al. | | 6,575,067 B2 | 6/2003 | Parks et al. |
| 5,791,441 A | 8/1998 | Matos et al. | | 6,578,460 B2 | 6/2003 | Sartori |
| 5,797,307 A | 8/1998 | Horton | | 6,578,856 B2 | 6/2003 | Kahle |
| 5,819,619 A | 10/1998 | Miller et al. | | 6,581,655 B2 | 6/2003 | Huang |
| 5,819,625 A | 10/1998 | Sberveglieri | | 6,595,096 B2 | 7/2003 | Ceroll et al. |
| 5,852,951 A | 12/1998 | Santi | | D478,917 S | 8/2003 | Ceroll et al. |
| 5,857,507 A | 1/1999 | Puzio et al. | | 6,601,493 B1 | 8/2003 | Crofutt |
| 5,861,809 A | 1/1999 | Eckstein et al. | | 6,607,015 B1 | 8/2003 | Chen |
| 5,875,698 A | 3/1999 | Ceroll et al. | | D479,538 S | 9/2003 | Welsh et al. |
| 5,880,954 A | 3/1999 | Thomson et al. | | 6,617,720 B1 | 9/2003 | Egan, III et al. |
| 5,921,367 A | 7/1999 | Kashioka et al. | | 6,619,348 B2 | 9/2003 | Wang |
| 5,927,857 A | 7/1999 | Ceroll et al. | | 6,640,683 B2 | 11/2003 | Lee |
| 5,930,096 A | 7/1999 | Kim | | 6,644,157 B2 | 11/2003 | Huang |
| 5,937,720 A | 8/1999 | Itzov | | 6,647,847 B2 | 11/2003 | Hewitt et al. |
| 5,942,975 A | 8/1999 | Sorensen | | 6,659,233 B2 | 12/2003 | DeVlieg |
| 5,943,932 A | 8/1999 | Sberveglieri | | 6,684,750 B2 | 2/2004 | Yu |
| 5,950,514 A | 9/1999 | Benedict et al. | | 6,722,242 B2 | 4/2004 | Chuang |
| 5,963,173 A | 10/1999 | Lian et al. | | 6,734,581 B1 | 5/2004 | Griffis |
| 5,974,927 A | 11/1999 | Tsune | | 6,736,042 B2 | 5/2004 | Behne et al. |
| 5,989,116 A | 11/1999 | Johnson et al. | | 6,742,430 B2 | 6/2004 | Chen |
| 6,009,782 A | 1/2000 | Tajima et al. | | 6,796,208 B1 | 9/2004 | Jorgensen |
| 6,018,284 A | 1/2000 | Rival et al. | | 6,800,819 B2 | 10/2004 | Sato et al. |
| 6,037,729 A | 3/2000 | Woods et al. | | 6,826,988 B2 | 12/2004 | Gass et al. |
| D422,290 S | 4/2000 | Welsh et al. | | 6,826,992 B1 | 12/2004 | Huang |
| 6,052,884 A | 4/2000 | Steckler et al. | | 6,840,144 B2 | 1/2005 | Huang |
| 6,062,121 A | 5/2000 | Ceroll et al. | | 6,854,371 B2 | 2/2005 | Yu |
| 6,070,484 A | 6/2000 | Sakamaki | | 6,857,345 B2 | 2/2005 | Gass et al. |
| 6,095,092 A | 8/2000 | Chou | | 6,874,397 B2 | 4/2005 | Chang |
| 6,112,785 A | 9/2000 | Yu | | 6,874,399 B2 | 4/2005 | Lee |
| 6,119,984 A | 9/2000 | Devine | | 6,877,410 B2 | 4/2005 | Gass et al. |
| 6,131,629 A | 10/2000 | Puzio et al. | | 6,880,440 B2 | 4/2005 | Gass et al. |
| 6,133,818 A | 10/2000 | Hsieh et al. | | 6,883,397 B2 | 4/2005 | Kimizuka |
| 6,141,192 A | 10/2000 | Garzon | | 6,889,585 B1 | 5/2005 | Harris et al. |
| 6,148,504 A | 11/2000 | Schmidt et al. | | 6,920,814 B2 | 7/2005 | Gass et al. |
| 6,148,703 A | 11/2000 | Ceroll et al. | | 6,922,153 B2 | 7/2005 | Pierga et al. |
| 6,150,826 A | 11/2000 | Hokodate et al. | | 6,945,148 B2 | 9/2005 | Gass et al. |
| 6,161,459 A | 12/2000 | Ceroll et al. | | 6,945,149 B2 | 9/2005 | Gass et al. |
| 6,170,370 B1 | 1/2001 | Sommerville | | 6,957,601 B2 | 10/2005 | Gass et al. |
| 6,244,149 B1 | 6/2001 | Ceroll et al. | | 6,968,767 B2 | 11/2005 | Yu |
| 6,250,190 B1 | 6/2001 | Ceroll et al. | | 6,986,370 B1 | 1/2006 | Schoene et al. |
| 6,257,061 B1 | 7/2001 | Nonoyama et al. | | 6,994,004 B2 | 2/2006 | Gass et al. |
| 6,283,002 B1 | 9/2001 | Chiang | | 6,997,090 B2 | 2/2006 | Gass et al. |
| 6,295,910 B1 | 10/2001 | Childs et al. | | 7,000,514 B2 | 2/2006 | Gass et al. |
| 6,312,028 B1 | 11/2001 | Wilkosz | | 7,024,975 B2 | 4/2006 | Gass et al. |
| 6,325,195 B1 | 12/2001 | Doherty | | 7,055,417 B1 | 6/2006 | Gass |
| 6,330,848 B1 | 12/2001 | Nishio et al. | | 7,077,039 B2 | 7/2006 | Gass et al. |
| 6,336,273 B1 | 1/2002 | Nilsson et al. | | 7,098,800 B2 | 8/2006 | Gass |
| 6,352,137 B1 | 3/2002 | Stegall et al. | | 7,100,483 B2 | 9/2006 | Gass et al. |
| 6,357,328 B1 | 3/2002 | Ceroll et al. | | 2002/0017175 A1 | 2/2002 | Gass et al. |
| 6,361,092 B1 | 3/2002 | Eagle et al. | | 2002/0017176 A1 | 2/2002 | Gass et al. |
| 6,366,099 B1 | 4/2002 | Reddi | | 2002/0017178 A1 | 2/2002 | Gass et al. |
| 6,376,939 B1 | 4/2002 | Suzuki et al. | | 2002/0017179 A1 | 2/2002 | Gass et al. |
| 6,404,098 B1 | 6/2002 | Kayama et al. | | 2002/0017180 A1 | 2/2002 | Gass et al. |
| 6,405,624 B2 | 6/2002 | Sutton | | 2002/0017181 A1 | 2/2002 | Gass et al. |
| 6,418,829 B1 | 7/2002 | Pilchowski | | 2002/0017182 A1 | 2/2002 | Gass et al. |
| 6,420,814 B1 | 7/2002 | Bobbio | | 2002/0017184 A1 | 2/2002 | Gass et al. |
| 6,427,570 B1 | 8/2002 | Miller et al. | | 2002/0017336 A1 | 2/2002 | Gass et al. |
| 6,430,007 B1 | 8/2002 | Jabbari | | 2002/0020261 A1 | 2/2002 | Gass et al. |
| 6,431,425 B1 | 8/2002 | Moorman et al. | | 2002/0020262 A1 | 2/2002 | Gass et al. |
| 6,450,077 B1 | 9/2002 | Ceroll et al. | | 2002/0020263 A1 | 2/2002 | Gass et al. |
| 6,453,786 B1 | 9/2002 | Ceroll et al. | | 2002/0020271 A1 | 2/2002 | Gass et al. |
| 6,460,442 B2 | 10/2002 | Talesky et al. | | 2002/0043776 A1 | 4/2002 | Chuang |
| 6,471,106 B1 | 10/2002 | Reining | | 2002/0050201 A1 | 5/2002 | Lane et al. |
| 6,479,958 B1 | 11/2002 | Thompson et al. | | 2002/0056349 A1 | 5/2002 | Gass et al. |
| 6,484,614 B1 | 11/2002 | Huang | | 2002/0059853 A1 | 5/2002 | Gass et al. |
| D466,913 S | 12/2002 | Ceroll et al. | | 2002/0059854 A1 | 5/2002 | Gass et al. |
| 6,492,802 B1 | 12/2002 | Bielski | | 2002/0069734 A1 | 6/2002 | Gass et al. |
| D469,354 S | 1/2003 | Curtsinger | | 2002/0088325 A1 | 7/2002 | Talesky et al. |
| 6,502,493 B1 | 1/2003 | Eccardt et al. | | 2002/0096030 A1 | 7/2002 | Wang |

| | | |
|---|---|---|
| 2002/0096591 A1 | 7/2002 | Tanji |
| 2002/0109036 A1 | 8/2002 | Denen et al. |
| 2002/0134212 A1 | 9/2002 | Ceroll et al. |
| 2002/0170399 A1 | 11/2002 | Gass et al. |
| 2002/0170400 A1 | 11/2002 | Gass |
| 2002/0174755 A1 | 11/2002 | Behne et al. |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2003/0213349 A1 | 11/2003 | Chang |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0066784 A1 | 3/2005 | Gass |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0123960 A1 | 6/2006 | Gass et al. |
| 2006/0123964 A1 | 6/2006 | Gass et al. |
| 2006/0179983 A1 | 8/2006 | Gass et al. |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Shop Fox® Fence Operating Manual, Woodstock International, Inc., 1996, revised May 1997.
Gordon Engineering Corp., Product Catalog, pp. cover, 1,3 and back, Brookfield, Connecticut, US, Oct. 1997.
Analog Devices, Inc., 3-Axis Capacitive Sensor—Preliminary Technical Data AD7103, pp. 1-40, 201 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Intructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10 Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10 Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
*Tablesaw Splitters and Blade Cover, Fine Woodworking*, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
*Young Inventor: Teen's Device Earns Her Trip to Science Fair, The Arizona Republic*, May 5, 2006.
Operator Injury Mitigation Using Electronic Sensing and Mechanical Braking and Decoupling Devices in Handheld Circular Saws, Erin F. Eppard, date unknown.
*You Should Have Invented It*, French television show video.
Laguna Tools table saw owner's manual, date unknown.

* cited by examiner

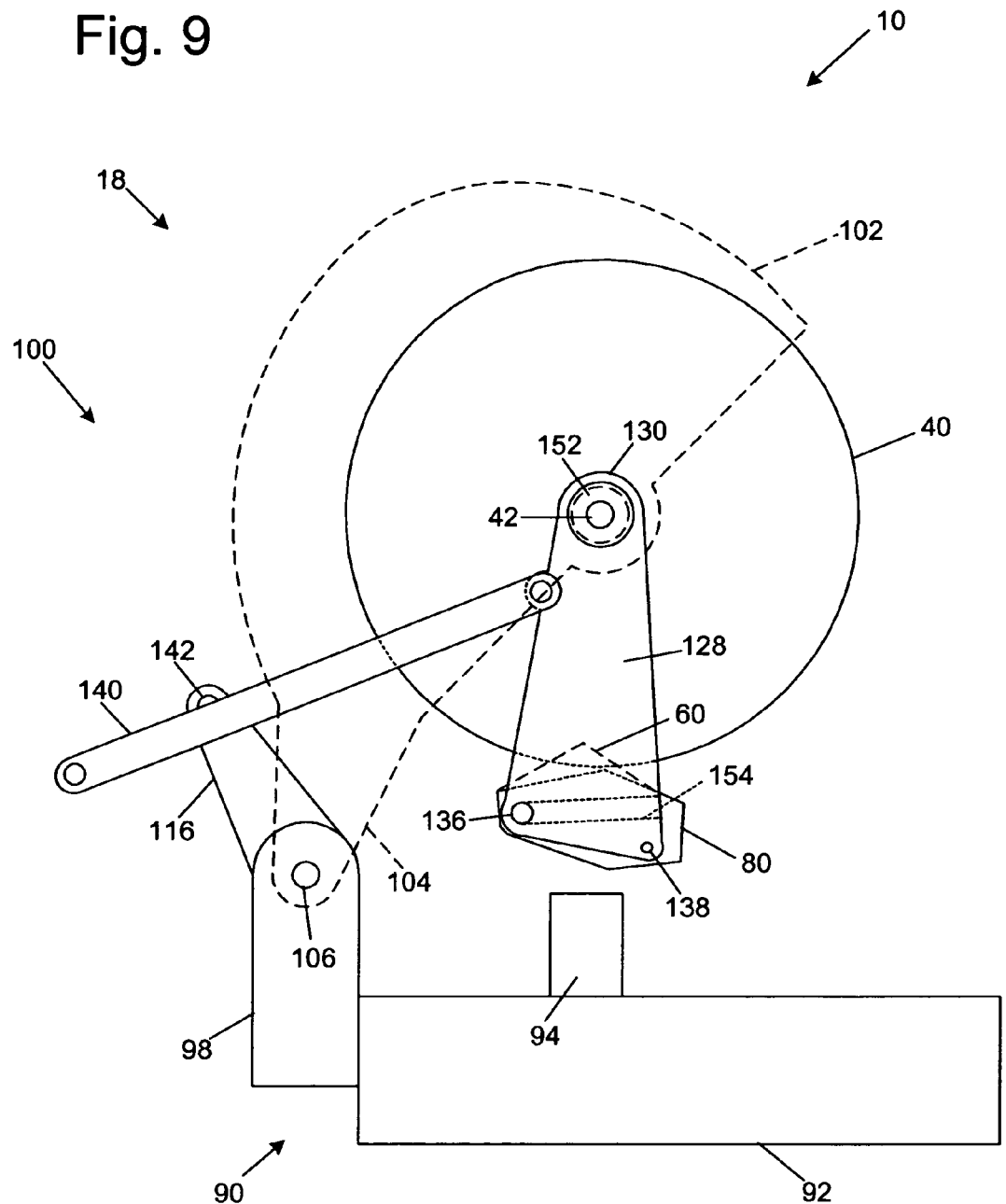

MITER SAW WITH IMPROVED SAFETY SYSTEM

CROSS-REFERENCE TO RELATED APPLICATION

This application is a continuation of the following U.S. Patent Applications, all of which are hereby incorporated by reference in their entireties for all purposes:

Ser. No. 09/929,426, filed Aug. 13, 2001, which claims the benefit of and priority from a number of U.S. Provisional Patent Applications including Ser. No. 60/225,200, filed Aug. 14, 2000;

Ser. No. 09/929,221, filed Aug. 13, 2001, which claims the benefit of and priority from a number of U.S. Provisional Patent Applications including Ser. No. 60/225,211, filed Aug. 14, 2000;

Ser. No. 09/929,240, filed Aug. 13, 2001, which claims the benefit of and priority from a number of U.S. Provisional Patent Applications including Ser. No. 60/225,056, filed Aug. 14, 2000;

Ser. No. 09/929,227, filed Aug. 13, 2001, which claims the benefit of and priority from a number of U.S. Provisional Patent Applications including Ser. No. 60/225,170, filed Aug. 14, 2000;

Ser. No. 11/401,050, filed Apr. 10, 2006, which is a continuation of a number of applications including Ser. No. 09/929,241, filed Aug. 13, 2001, issuing as U.S. Pat. No. 7,024,975 on Apr. 11, 2006, which in turn claimed the benefit of and priority from a number of U.S. Provisional Patent Applications including Ser. No. 60/225,169, filed Aug. 14, 2000;

Ser. No. 09/929,242, filed Aug. 13, 2001, which claims the benefit of and priority from a number of U.S. Provisional Patent Applications including Ser. No. 60/225,089, filed Aug. 14, 2000;

Ser. No. 10/984,643, filed Nov. 8, 2004, which is a continuation of a number of applications, including Ser. No. 10/205,164, filed Jul. 25, 2002, issuing as U.S. Pat. No. 6,945,149 on Sep. 20, 2005, which in turn claimed the benefit of and priority from U.S. Provisional Patent Application Ser. No. 60/307,756, filed Jul. 25, 2001, and Ser. No. 10/202,928, filed Jul. 25, 2002, issuing as U.S. Pat. No. 7,000,514 on Feb. 21, 2006, which in turn claimed the benefit of and priority from U.S. Provisional Patent Application Ser. No. 60/308,492, filed Jul. 27, 2001;

Ser. No. 09/929,236, filed Aug. 13, 2001, which claims the benefit of and priority from a number of U.S. Provisional Patent Applications including Ser. No. 60/225,201, filed Aug. 14, 2000;

Ser. No. 11/061,162, filed Feb. 18, 2005, which is a continuation of Ser. No. 09/929,244, filed Aug. 13, 2001, issuing as U.S. Pat. No. 6,857,345 on Feb. 22, 2005, which in turn claimed the benefit of and priority from a number of U.S. Provisional Patent Applications including Ser. No. 60/225,212, filed Aug. 14, 2000;

Ser. No. 09/929,237, filed Aug. 13, 2001, which claims the benefit of and priority from a number of U.S. Provisional Patent Applications including Ser. No. 60/225,059, filed Aug. 14, 2000;

Ser. No. 09/929,234, filed Aug. 13, 2001, which claims the benefit of and priority from a number of U.S. Provisional Patent Applications including Ser. No. 60/225,094, filed Aug. 14, 2000;

Ser. No. 09/929,425, filed Aug. 13, 2001, which claims the benefit of and priority from a number of U.S. Provisional Patent Applications including Ser. No. 60/225,210, filed Aug. 14, 2000;

Ser. No. 11/190,111, filed Jul. 25, 2005, which is a continuation of a number of applications including Ser. No. 09/929,226, filed Aug. 13, 2001, issuing as U.S. Pat. No. 6,920,814 on Jul. 26, 2005, which in turn claimed the benefit of and priority from a number of U.S. Provisional Patent Applications including Ser. No. 60/225,206, filed Aug. 14, 2000; Ser. No. 10/205,164, filed Jul. 25, 2002, issuing as U.S. Pat. No. 6,945,149 on Sep. 20, 2005, which in turn claimed the benefit of and priority from U.S. Provisional Patent Application Ser. No. 60/307,756, filed Jul. 25, 2001; and Ser. No. 10/202,928, filed Jul. 25, 2002, issuing as U.S. Pat. No. 7,000,514 on Feb. 21, 2006, which in turn claimed the benefit of and priority from U.S. Provisional Patent Application Ser. No. 60/308,492, filed Jul. 27, 2001;

Ser. No. 09/929,235, filed Aug. 13, 2001, which claims the benefit of and priority from a number of U.S. Provisional Patent Applications including Ser. No. 60/225,058, filed Aug. 14, 2000;

Ser. No. 09/929,238, filed Aug. 13, 2001, which claims the benefit of and priority from a number of U.S. Provisional Patent Applications including Ser. No. 60/225,057, filed Aug. 14, 2000;

Ser. No. 09/676,190, filed Sep. 29, 2000, which claims the benefit of and priority from the following U.S. Provisional Patent Applications: Ser. No. 60/182,866, filed Feb. 16, 2000, and Ser. No. 60/157,340, filed Oct. 1, 1999;

Ser. No. 10/053,390, filed Jan. 16, 2002, which is a continuation-in-part of a number of applications including Ser. No. 09/676,190, filed Sep. 29, 2000; and Ser. No. 10/053,390 also claims the benefit of and priority from U.S. Provisional Patent Application Ser. No. 60/270,011, filed Feb. 20, 2001;

Ser. No. 11/348,580, filed Feb. 6, 2006, which is a continuation of a number of applications including Ser. No. 10/052,705, filed Jan. 16, 2002, issuing as U.S. Pat. No. 6,994,004 on Feb. 7, 2006, which in turn claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, and Ser. No. 60/273,178, filed Mar. 2, 2001; and Ser. No. 11/348,580 also claims the benefit of and priority from U.S. Provisional Patent Application Ser. No. 60/667,485, filed Mar. 31, 2005;

Ser. No. 10/932,339, filed Sep. 1, 2004, which is a continuation of Ser. No. 10/047,066, filed Jan. 14, 2002, issuing as U.S. Pat. No. 6,945,148 on Sep. 20, 2005, which in turn claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, and Ser. No. 60/273,902, filed Mar. 6, 2001; and Ser. No. 10/392,339 is also a continuation of Ser. No. 10/050,085, filed Jan. 14, 2002;

Ser. No. 10/100,211, filed Mar. 13, 2002, which claims the benefit of and priority from U.S. Provisional Patent Application Ser. No. 60/275,583, filed Mar. 13, 2001;

Ser. No. 11/256,757, filed Oct. 24, 2005, which is a continuation of Ser. No. 09/955,418, filed Sep. 17, 2001, issuing as U.S. Pat. No. 6,957,601 on Oct. 25, 2005, which in turn claimed the benefit of and priority to a number of U.S. Provisional Patent Applications, including: Ser. No. 60/233,459, filed Sep. 18, 2000, Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, Ser. No. 60/273,902, filed Mar. 6, 2001, Ser. No. 60/275,594, filed Mar. 13, 2001, Ser. No. 60/275,595, filed Mar. 13, 2001, Ser. No. 60/279,313, filed Mar. 27, 2001, Ser. No. 60/292,081, filed May 17, 2001, Ser. No. 60/292,100, filed May 17, 2001, Ser. No. 60/298,207, filed Jun. 13, 2001, Ser. No. 60/302,937, filed Jul. 2, 2001, Ser. No. 60/302,916, filed Jul. 3, 2001, Ser. No. 60/306,202, filed Jul. 18, 2001, Ser. No. 60/307,756, filed Jul. 25, 2001, Ser. No. 60/308,492, filed Jul. 27, 2001, and Ser. No. 60/312,141, filed Aug. 13, 2001;

Ser. No. 10/146,527, filed May 15, 2002, which claims the benefit of and priority from U.S. Provisional Patent Application Ser. No. 60/292,100, filed May 17, 2001;

Ser. No. 11/218,356, filed Sep. 2, 2005, which is a continuation of a number of applications including Ser. No. 10/146,527, filed May 15, 2002, which in turn claims the benefit of and priority from U.S. Provisional Patent Application Ser. No. 60/292,100, filed May 17, 2001;

Ser. No. 10/172,553, filed Jun. 13, 2002, which claims the benefit of and priority from U.S. Provisional Patent Application Ser. No. 60/298,207, filed Jun. 13, 2001;

Ser. No. 10/189,031, filed Jul. 2, 2002, which claims the benefit of and priority from U.S. Provisional Patent Application Ser. No. 60/302,937, filed Jul. 2, 2001;

Ser. No. 10/189,027, filed Jul. 2, 2002, which claims the benefit of and priority from U.S. Provisional Patent Application Ser. No. 60/302,916, filed Jul. 3, 2001;

Ser. No. 11/353,423, filed Feb. 13, 2006, which is a continuation of Ser. No. 10/785,361, filed Feb. 23, 2004, issuing as U.S. Pat. No. 6,997,090 on Feb. 14, 2006, which in turn is a continuation of Ser. No. 10/215,929, filed Aug. 9, 2002, which in turn claimed the benefit of and priority to U.S. Provisional Patent Application Ser. No. 60/312,141, filed Aug. 13, 2001;

Ser. No. 11/208,214, filed Aug. 19, 2005, which is a continuation of Ser. No. 10/251,576, filed Sep. 20, 2002, which in turn was a continuation-in-part of Ser. No. 10/197,975, filed Jul. 18, 2002, and which claimed the benefit of and priority to U.S. Provisional Patent Application Ser. No. 60/323,975, filed Sep. 21, 2001, and Ser. No. 11/208,214 is also a continuation-in-part of Ser. No. 09/676,190, filed Sep. 29, 2000, which in turn claimed the benefit of and priority from U.S. Provisional Patent Application Ser. No. 60/157,340, filed Oct. 1, 1999 and Ser. No. 60/182,866, filed Feb. 16, 2000;

Ser. No. 10/243,042, filed Sep. 13, 2002, which claims the benefit of and priority from U.S. Provisional Patent Application Ser. No. 60/324,729, filed Sep. 24, 2001;

Ser. No. 10/292,607, filed Nov. 12, 2002, which claims the benefit of and priority from U.S. Provisional Patent Application Ser. No. 60/335,970, filed Nov. 13, 2001;

Ser. No. 10/345,630, filed Jan. 15, 2003, which claims the benefit of and priority from U.S. Provisional Patent Application Ser. No. 60/349,989, filed Jan. 16, 2002;

Ser. No. 10/341,260, filed Jan. 13, 2003, which claims the benefit of and priority from U.S. Provisional Patent Application Ser. No. 60/351,797, filed Jan. 25, 2002;

Ser. No. 10/643,296, filed Aug. 18, 2003, which claims the benefit of and priority from U.S. Provisional Patent Application Ser. No. 60/406,138, filed Aug. 27, 2002;

Ser. No. 10/794,161, filed Mar. 4, 2004, which claims the benefit of and priority from U.S. Provisional Patent Application Ser. No. 60/452,159, filed Mar. 5, 2003;

Ser. No. 10/923,290, filed Aug. 20, 2004, which claims the benefit of and priority from U.S. Provisional Patent Application Ser. No. 60/496,550, filed Aug. 20, 2003;

Ser. No. 10/923,273, filed Aug. 20, 2004, which claims the benefit of and priority from U.S. Provisional Patent Application Ser. No. 60/496,574, filed Aug. 20, 2003;

Ser. No. 11/401,774, filed Apr. 11, 2006, which is a continuation of a number of applications including Ser. No. 11/027,322, filed Dec. 31, 2004, which in turn claimed the benefit of and priority from U.S. Provisional Patent Application Ser. No. 60/533,598, filed Dec. 31, 2003, and Ser. No. 11/401,774 is also a continuation of Ser. No. 09/676,190, filed Sep. 29, 2000, which in turn claimed the benefit of and priority from U.S. Provisional Patent Application Ser. No. 60/157,340, filed Oct. 1, 1999 and Ser. No. 60/182,866, filed Feb. 16, 2000;

Ser. No. 10/923,282, filed Aug. 20, 2004, which claims the benefit of and priority from U.S. Provisional Patent Application Ser. No. 60/496,568, filed Aug. 20, 2003;

Ser. No. 11/027,600, filed Dec. 31, 2004, which claims the benefit of and priority from U.S. Provisional Patent Application Ser. No. 60/533,791, filed Dec. 31, 2003;

Ser. No. 11/107,499, filed Apr. 15, 2005;

Ser. No. 11/027,254, filed Dec. 31, 2004, which claims the benefit of and priority from U.S. Provisional Patent Application Ser. No. 60/533,852, filed Dec. 31, 2003;

Ser. No. 11/026,114, filed Dec. 31, 2004, which claims the benefit of and priority from U.S. Provisional Patent Application Ser. No. 60/533,811, filed Dec. 31, 2003;

Ser. No. 11/026,006, filed Dec. 31, 2004, which claims the benefit of and priority from U.S. Provisional Patent Application Ser. No. 60/533,575, filed Dec. 31, 2003;

Ser. No. 11/045,972, filed Jan. 28, 2005, which claims the benefit of and priority from U.S. Provisional Patent Application Ser. No. 60/540,377, filed Jan. 29, 2004;

Ser. No. 11/395,502, filed Mar. 31, 2006, which claims the benefit of and priority from U.S. Provisional Patent Application Ser. No. 60/667,485, filed Mar. 31, 2005; and Ser. No. 11/098,984, filed Apr. 4, 2005, which is a continuation of a Ser. No. 09/929,238, filed Aug. 13, 2001, Ser. No. 10/047,066, filed Jan. 14, 2002, Ser. No. 10/051,782, filed Jan. 15, 2002, issuing as U.S. Pat. No. 6,877,410 on Apr. 12, 2005, which in turn claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, Ser. No. 60/273,902, filed Mar. 6, 2001, and Ser. No. 60/275,594, filed Mar. 13, 2001; and Ser. No. 11/098,984 is also a continuation of Ser. No. 10/052,806, filed Jan. 16, 2002, issuing as U.S. Pat. No. 6,880,440 on Apr. 19, 2005, which in turn claimed the benefit of and priority from the following U.S. Provisional Patent Applications: Ser. No. 60/270,011, filed Feb. 20, 2001, Ser. No. 60/270,941, filed Feb. 22, 2001, and Ser. No. 60/270,942, filed Feb. 22, 2001; and Ser. No. 11/098,984 is also a continuation of Ser. No. 10/643,296, filed Aug. 18, 2003, and Ser. No. 10/932,339, filed Sep. 1, 2004.

FIELD

The present invention relates to miter saws, and more particularly to a miter saw with a high-speed safety system.

BACKGROUND

Miter saws are a type of woodworking machinery used to cut workpieces of wood, plastic and other materials. Miter saws typically include a base upon which workpieces are placed and include a circular saw blade mounted on a pivot arm. A person uses a miter saw by placing a workpiece on the base beneath the upraised blade and then bringing the blade down via the pivot arm to cut the workpiece. Miter saws present a risk of injury to users because the spinning blade is often exposed when in use. Furthermore, users often use their hands to position and support workpieces beneath the blade, which increases the chance that an injury will occur.

The present invention provides miter saws with improved safety systems that are adapted to detect the occurrence of one or more dangerous, or triggering, conditions during use, such as when a user's body contacts a spinning saw blade. When such a condition occurs, a safety system is actuated to limit or even prevent injury to the user.

BRIEF DESCRIPTION OF THE DRAWINGS

FIG. 9 is similar to FIG. 6 but shows the radial support arms uncoupled from the brace member to pivot the cartridge below the housing for replacement.

DETAILED DESCRIPTION

Figure 1:
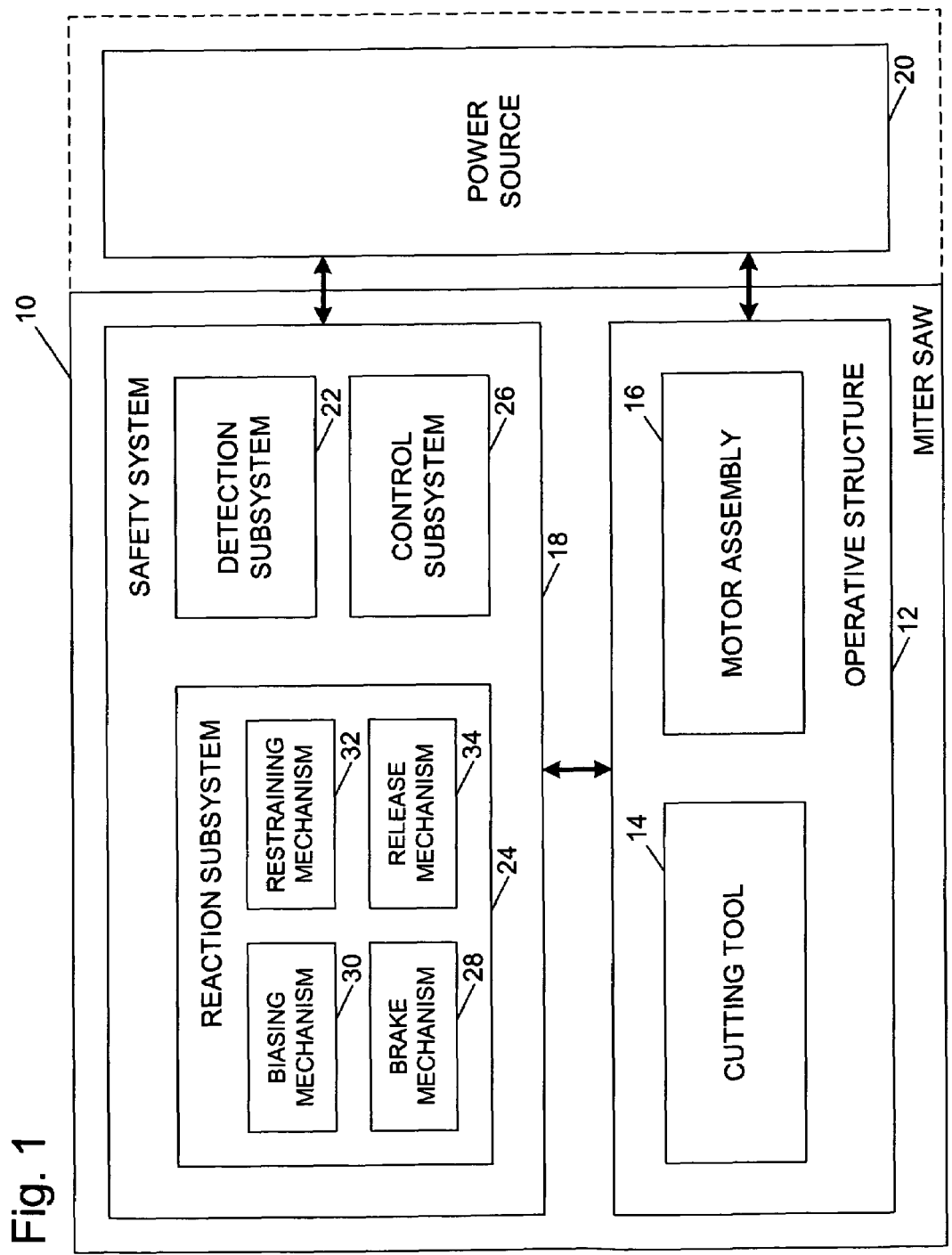
FIG. 1 is a schematic block diagram of a miter saw with a fast-acting safety system according to the present invention.

A miter saw according to the present invention is shown schematically in FIG. 1 and indicated generally at 10. Miter saw 10 may be any of a variety of different types and configurations of miter saw adapted for cutting workpieces, such as wood, plastic, etc. Miter saw 10 includes an operative structure 12 having a cutting tool 14 and a motor assembly 16 adapted to drive the cutting tool. Miter saw 10 also includes a safety system 18 configured to minimize the potential of a serious injury to a person using miter saw 10. Safety system 18 is adapted to detect the occurrence of one or more dangerous, or triggering, conditions during use of miter saw 10. If such a dangerous condition is detected, safety system 18 is adapted to engage operative structure 12 to limit any injury to the user caused by the dangerous condition.

Miter saw 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of miter saw 10.

It will be appreciated that operative structure 12 may take any one of many different forms, depending on the type of miter saw 10. As will be described in more detail below, operative structure 12 typically takes the form of an arm pivotally coupled to a base. Cutting tool 14 is mounted on the arm and pivotal toward a workpiece supported by the base. Alternatively, the arm may be both pivotally and slidably coupled to the base.

Motor assembly 16 includes one or more motors adapted to drive cutting tool 14. The motors may be either directly or indirectly coupled to the cutting tool. Typically, motor assembly 16 is mounted on the pivot arm and directly coupled to the cutting tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of miter saw 10. In addition, control subsystem 26 typically includes one or more instruments operable by a user to control the miter saw. The control subsystem is configured to control miter saw 10 in response to the inputs it receives.

Detection subsystem 22 is configured to detect one or more dangerous, or triggering, conditions during use of miter saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S. patent application Ser. No. 09/676,190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of miter saw 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No.

60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of miter saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
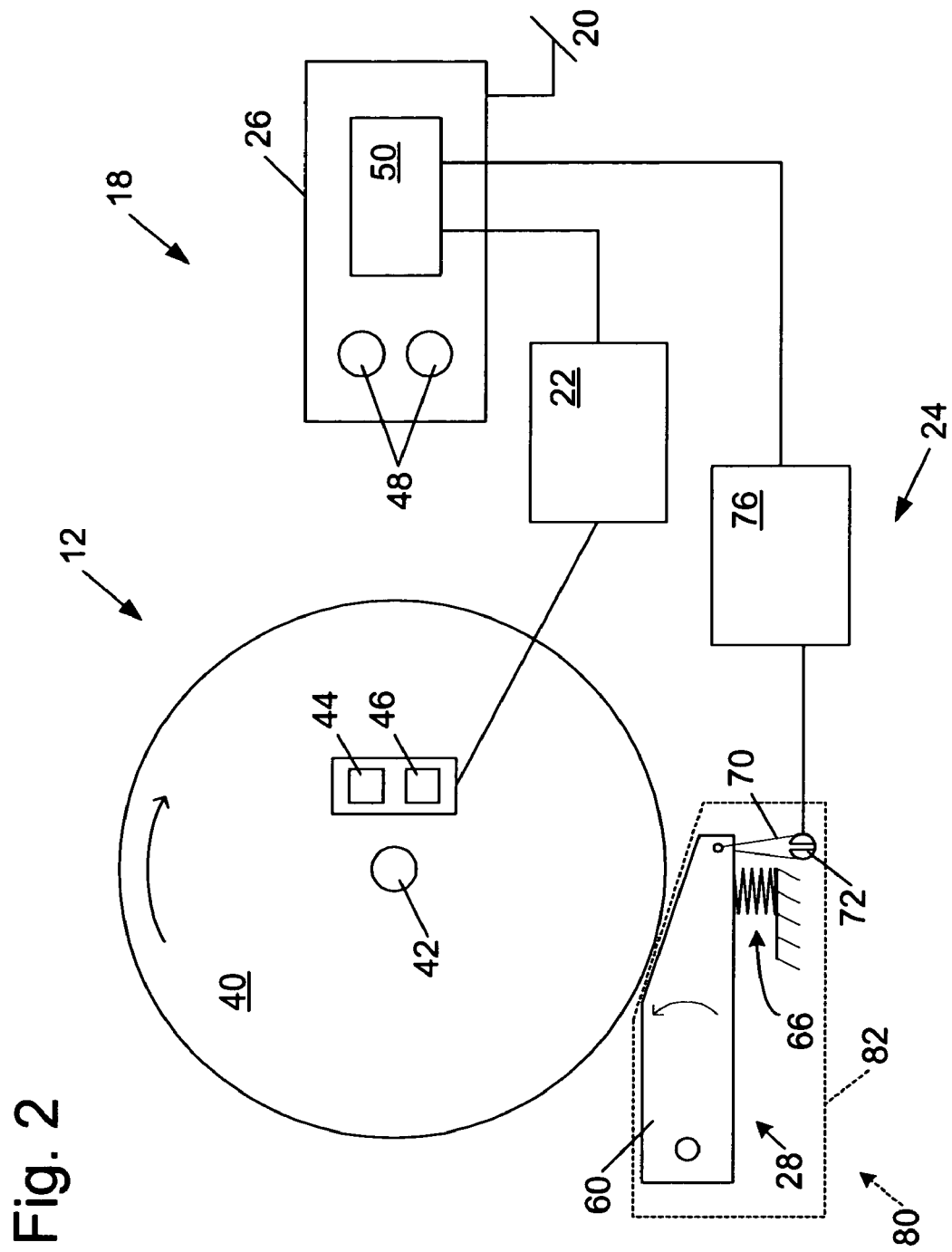
FIG. 2 is a schematic diagram of an exemplary safety system configured to stop the miter saw blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of miter saw 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, brake mechanism 28 is adapted to engage the teeth of blade 40 and stop rotation of the blade.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of miter saw 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000, U.S. patent application Ser. No. 09/929,221, filed Aug. 13, 2001, U.S. Provisional Patent Application Ser. No. 60/270,011, filed Feb. 20, 2001, and U.S. patent application Ser. No. 10/053,390, filed Jan. 16, 2002, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW), Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No.

60/225,056, filed Aug. 14, 2000, U.S. patent application Ser. No. 09/929,240, filed Aug. 13, 2001, U.S. Provisional Patent Application Ser. No. 60/225,170, filed Aug. 14, 2000, U.S. patent application Ser. No. 09/929,227, filed Aug. 13, 2001, U.S. Provisional Patent Application Ser. No. 60/225,169, filed Aug. 14, 2000 and U.S. patent application Ser. No. 09/929,241, filed Aug. 13, 2001, the disclosures of which are herein incorporated by reference.

It will be appreciated that activation of the brake mechanism may require the replacement of one or more portions of safety system 18. For example, pawl 60 and fusible member 70 typically are single-use components which must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/929,236, filed Aug. 13, 2001, U.S. Provisional Patent Application Ser. No. 60/225,212, filed Aug. 14, 2000 and U.S. patent application Ser. No. 09/929,244, filed Aug. 13, 2001, the disclosures of which are herein incorporated by reference.

In the exemplary embodiment illustrated in FIG. 2, reaction subsystem 24 is configured to act on cutting tool 14 and stop rotation of blade 40. As mentioned above, reaction subsystem 24 may be configured also to act on a different portion of operative structure 12 to stop and/or reverse the translation of blade 40 toward the workpiece and the user's body. Otherwise, the blade may continue to move toward the user's body even though the blade has stopped rotating. For example, U.S. Provisional Patent Application Ser. No. 60/270,941, filed Feb. 22, 2001, U.S. patent application Ser. No. 10/052,273, filed Jan. 16, 2002, U.S. Provisional Patent Application Ser. No. 60/270,942, filed Feb. 22, 2001, U.S. patent application Ser. No. 10/052,806, filed Jan. 16, 2002, U.S. Provisional Patent Application Ser. No. 60/273,178, filed Mar. 2, 2001, U.S. patent application Ser. No. 10/052, 274, filed Jan. 16, 2002, U.S. Provisional Patent Application Ser. No. 60/273,902, filed Mar. 6, 2001, U.S. patent application Ser. No. 10/050,085, filed Jan. 14, 2002, U.S. Provisional Patent Application Ser. No. 60/279,313, filed Mar. 27, 2001, and U.S. patent application Ser. No. 10/051,782, filed Jan. 15, 2002, the disclosures of which are herein incorporated by reference, describe various alternative embodiments of reaction subsystem 24 configured to stop any downward movement of the miter saw blade and/or move the blade upward away from the workpiece and the user's body.

Figure 3:
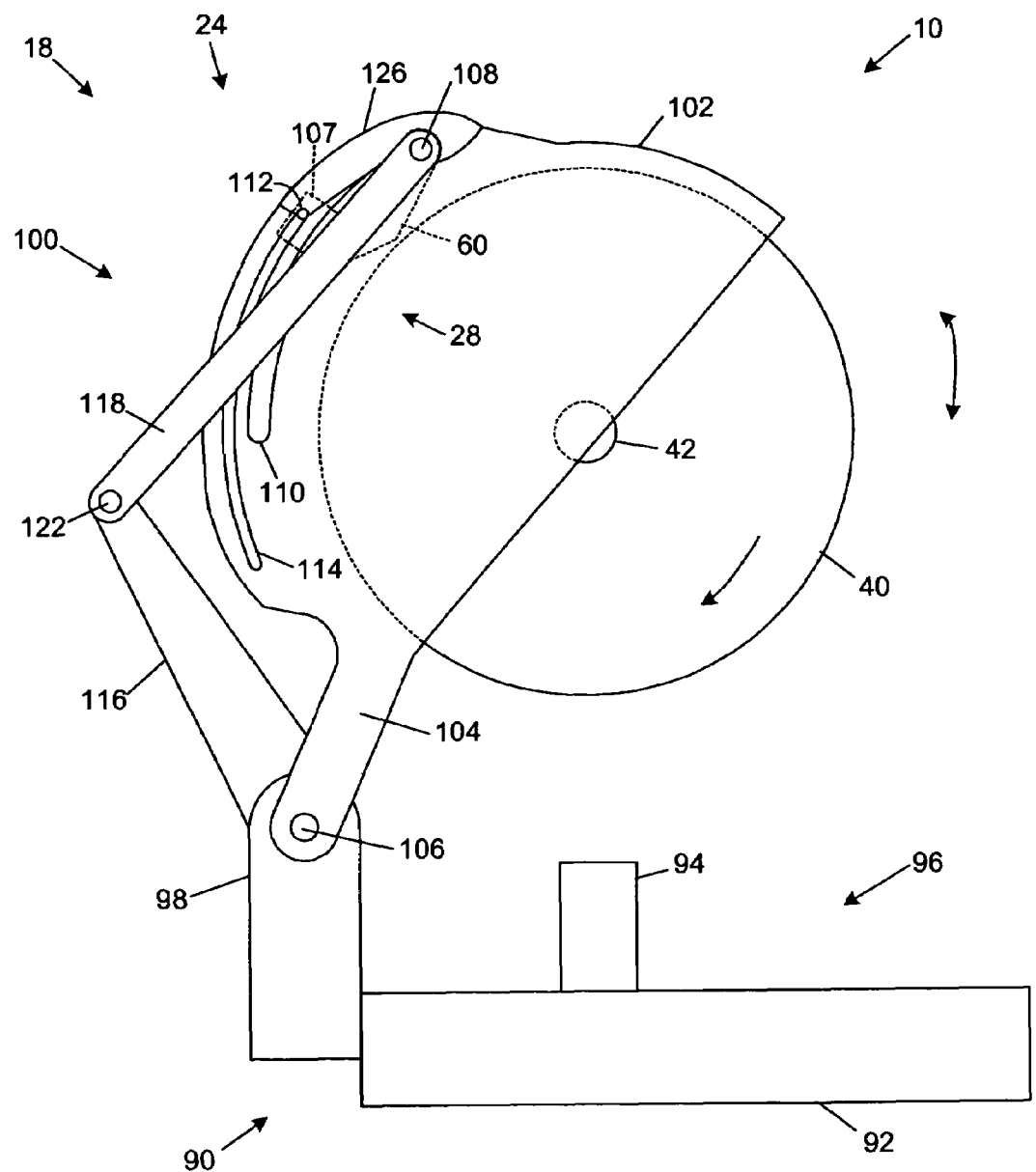
FIG. 3 is a schematic side elevation of an exemplary miter saw having a safety system configured to stop both the rotation and downward movement of the blade.
Figure 4:
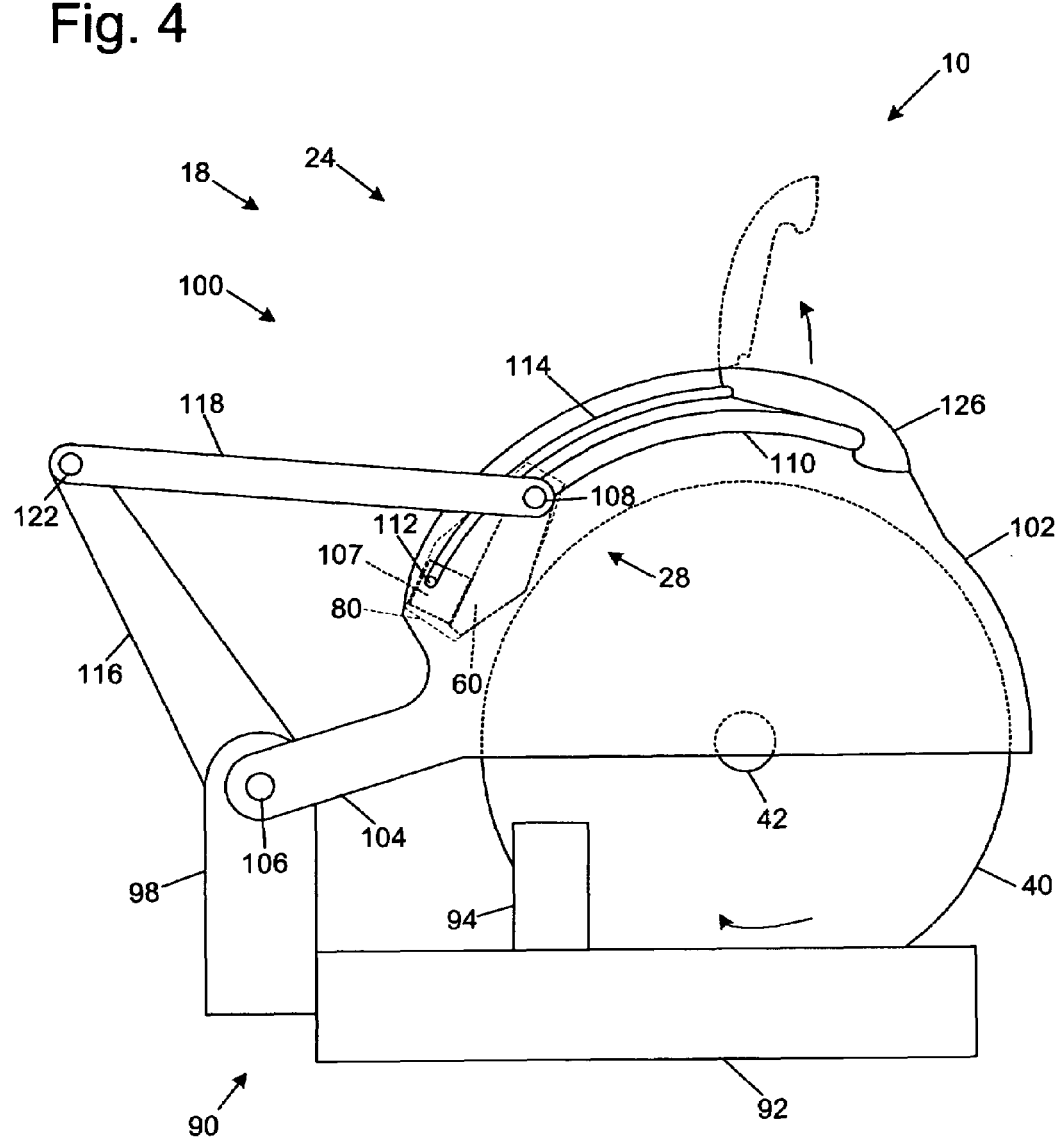
FIG. 4 is similar to FIG. 3 but shows the pivot arm assembly pivoted downward into the cutting zone.
Figure 5:
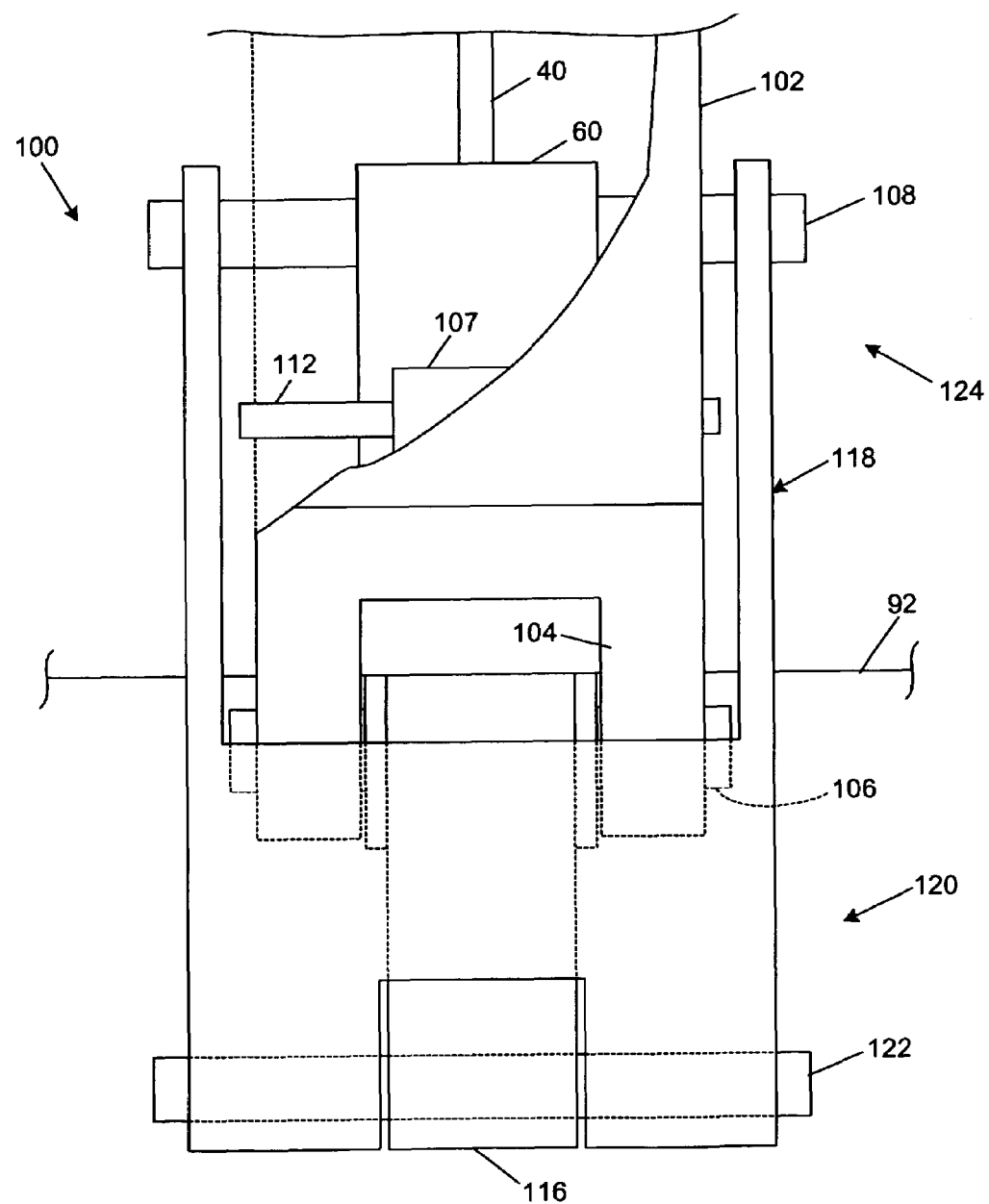
FIG. 5 is a partial top plan view of the miter saw of FIG. 3, with a portion of the housing cut away to show the brake pawl.

Turning attention now to FIGS. 3-5, another alternative embodiment is illustrated in which reaction subsystem 24 is configured to stop both the rotation and downward movement of the blade. Exemplary miter saw 10 includes a base assembly 90 having a base 92 adapted to support a workpiece during cutting. Typically, one or more fences 94 are mounted on base 92 and adapted to prevent workpieces from shifting across the base during cutting. Base 92 and fences 94 define a cutting zone 96 in which workpieces may be cut. Exemplary base assembly 90 also includes a tilt mechanism 98 coupled to base 92.

As in the embodiments described above, blade 40 is mounted on a rotatable arbor 42. The arbor is driven by a motor assembly (not shown) which is supported above base 92 by a pivot arm assembly 100. As shown in FIGS. 3 and 4, the pivot arm assembly is selectively pivotal toward and away from cutting zone 96 to cut workpieces with the blade. In addition, at least a portion of tilt mechanism 98 is selectively tiltable relative to base 92 to make beveled cuts in the workpiece.

Pivot arm assembly 100 includes a housing 102 extending outward from one end of an arm 104. The opposite end of arm 104 is connected to tilt mechanism 98 by a pivot coupling 106. Housing 102 is configured to extend at least partially around an upper portion of blade 40. Typically, pivot arm assembly 100 includes a spring or other biasing mechanism (not shown) adapted to maintain the housing and blade in a fully upward position away from cutting zone 96 when the miter saw is not in use.

Reaction subsystem 24 includes a brake mechanism 28 having at least one brake pawl 60 engageable by an actuator 107. The actuator typically includes a restraining mechanism adapted to hold the brake pawl away from the blade against the urging of a biasing mechanism. In response to an activation signal, a release mechanism within the actuator releases the brake pawl from the restraining mechanism to pivot into the blade, usually stopping the blade within approximately 2-5 milliseconds. Optionally, brake pawl 60 and/or one or more components of actuator 106 may be contained in a replaceable cartridge, such as indicated at 80 in FIG. 4. Exemplary actuators, restraining mechanisms, biasing mechanisms, release mechanisms, cartridges and brake pawls are described in more detail above and in the incorporated references.

Brake pawl 60 is mounted on a movable pivot pin 108 configured to slide within a first set of channels 110 in either side of housing 102. First set of channels 110 define concentric arcs about arbor 42. As a result, pivot pin 108 is maintained at a constant radius from the arbor as it slides within the first set of channels. A positioning pin 112 extends from one or both sides of actuator 106 to slide within a second set of channels 114. The second set of channels also define concentric arcs about arbor 42 so that positioning pin 112 maintains a constant radius from the arbor as it slides within the second set of channels. Since brake pawl 60 is coupled to actuator 112, both the brake pawl and actuator are maintained in a constant orientation relative to the arbor and the perimeter of the blade as pivot pin 108 slides within first set of channels 110.

As shown in FIG. 5, brake pawl 60 is laterally positioned on pivot pin 108 so that a central portion of the brake pawl is aligned with the blade. Brake mechanism 28 may include suitable positioning structure to maintain the brake pawl aligned with the blade. For example, annular spacers may be placed on pivot pin 108 on either side of the brake pawl to butt against the inner sides of housing 102. Alternatively, the brake pawl may be constructed to have a width substantially equal to the inner width of the housing. In alternative embodiments where cartridge 80 is used, the cartridge may be sized to extend substantially from one inner side of the housing to the other. As a further alternative, the inner sides of the housing may include projections which extend inward to center the cartridge or brake pawl relative to the blade.

Base assembly 90 also includes a brace member 116 extending upward from tilt mechanism 98. In the exemplary embodiment, brace member 116 extends upward from the tilt mechanism at an angle away from pivot arm assembly 100 so that the pivot arm assembly is not obstructed from pivoting to a fully raised position, as illustrated in FIG. 3. It will be appreciated that brace member 116 and tilt mechanism 98 may be formed as an integral, unitary structure. Alternatively, the brace member and tilt mechanism may be formed separately and then coupled together. In any event, the brace member is coupled to the tilt mechanism so as to prevent any pivoting movement of the brace member toward or away from the cutting zone. However, the brace member is configured to tilt along with the tilt mechanism relative to the base when the miter saw is adjusted for bevel cuts.

Pivot pin 108 is coupled to brace member 116 by a linkage assembly 118. As best seen in FIG. 5, one end of linkage assembly 118 includes a fork structure 120 pivotally coupled to a pivot pin 122 mounted in brace member 116. The opposite end of linkage assembly 118 includes a fork structure 124 pivotally coupled to each end of pivot pin 108. As shown, linkage assembly 118 is coupled to pivot pin 108 on either side of brake pawl 60. This provides increased stability and support when the brake pawl engages the blade. In an alternative embodiment, the linkage assembly may take the form of a pair of separate arms extending between pin 108 and pin 122 on either side of the brake pawl. As a further alternative, linkage assembly 118 may be configured to engage pivot pin 108 and/or pivot pin 122 on only a single side of the brake pawl. As another alternative embodiment, the linkage assembly may be configured to engage the center of pivot pin 108 (e.g., through a cut-out in the brake pawl) and/or the center of pivot pin 122 (e.g., through a cut-out in brace member 116).

In any event, the linkage assembly pivots relative to brace member 116 as the housing is pivoted toward and away from the cutting zone. Brace member 116 pushes or pulls pivot pin 108 and brake pawl 60 around the perimeter of the blade in first set of channels 110 as the housing is raised or lowered. Thus, the brake pawl is maintained at a constant distance from the brace member regardless of the position of the housing.

In response to an activation signal from a control subsystem (not shown), brake pawl 60 is pivoted into the teeth of blade 40. When the brake pawl engages the blade the angular momentum of the blade produces a force on the brake pawl that tends to urge the brake pawl to move in a clockwise direction along first set of channels 110. In other words, at least a portion of the angular momentum of the blade is transferred to the brake pawl. The force on brake pawl 60 is transferred to brace member 116 by linkage assembly 118. Linkage assembly 118 may be constructed of any relatively rigid material adapted to support brake pawl 60 during braking of the blade, including metal, plastic, etc.

Brace member 116 prevents the brake pawl from sliding clockwise within first set of channels 110 unless housing 102 pivots upward away from the cutting zone. As a result, pivot arm assembly 100 will be urged upward by engagement of the brake pawl with the blade. The amount of upward force on the blade will depend, at least partially, on the length of brace member 116. As the length of the brace member is increased, the upward force on the blade during braking will likewise increase. Typically, the length of the brace member is selected so that the upward force on the blade during braking is sufficient to stop any downward motion of the housing under normal operating conditions (i.e., the housing is pivoted downward toward the cutting zone at a normal speed). Optionally, the length of the brace member is selected so that the upward force on the blade during braking is sufficient to overcome and reverse any normal downward momentum of the housing and blade, thereby retracting the blade upward away from cutting zone 96.

In any event, brake pawl 60 is arranged and supported to convert at least a portion of the kinetic energy of the rotating blade into an upward force on the blade and housing. Thus, exemplary brake mechanism 28 is configured to stop both the rotation of the blade and any downward movement of the blade using a single brake pawl. As a result, only a single cartridge or brake pawl need be replaced after the brake mechanism has been triggered.

Since the upward force on the blade and housing is produced by the rapid deceleration of the blade by the brake pawl, the upward force is only temporary. Once the rotation of the blade has stopped, the housing is free to pivot toward or away from the cutting zone. Nevertheless, the blade will remain locked against further rotation until the cartridge is removed.

Housing 102 may include one or more sections 126 which may be removed or repositioned to allow installation and removal of the cartridge or brake pawl and actuator. Pivot pin 108 is typically removed by sliding it completely through the brake pawl. Positioning pin 112 may also be slid completely through the actuator and/or cartridge. Alternatively, positioning pin 112 may be dual spring-loaded pins which can be depressed to allow the cartridge to be installed and removed more easily. Optionally, housing 102 may include one or more removable covers adapted to cover one or both of the first and second set of channels during normal operation. It will be appreciated that housing 102 and the components of the brake mechanism may be configured in any of a variety of different ways to allow the brake mechanism to be easily replaced.

While one particular embodiment has been described above, many modifications and alterations are possible. For example, FIGS. 6-9 illustrate an alternative exemplary embodiment in which the brake mechanism includes a brake pawl support structure that pivots within the housing. As shown, the brake mechanism includes one or more radial support arms 128 adapted to support cartridge 80 at a constant radial distance and orientation about arbor 42. Support arms 128 are configured to pivot about the elongate central axis of arbor 42. Each arm includes an annular collar portion 130 configured to fit on and swing about one of a pair of support rings 132. One support ring 132 extends from the inner surface of housing 102, while the other support ring extends from motor assembly 16. Collar portions 130 may be retained on support rings 132 by ring clips 134 or any other suitable mechanism. It will be appreciated that support arms 128 may alternatively be coupled to pivot about the arbor in a variety of other ways such as are known to those of skill in the art.

Cartridge 80 is coupled to support arms 128 by a pivot pin 136 and a positioning pin 138. The pivot and positioning pins maintain the cartridge at a constant radial distance and orientation relative to the perimeter of the blade as support arms 128 pivot around the arbor. The support arms are coupled to a brace member 116 by one or more linkages 140. The rear end of each linkage 140 is pivotally coupled to brace member 116 by a pivot pin 142. The front end of each linkage is pivotally coupled to a different one of support arms 128 by one or more pivot pins 144. In the exemplary embodiment, pivot pins 144 are mounted in outwardly projecting shoulder regions 146 formed in each support arm 128. Shoulder regions 146 are configured to ensure pivot pins 144 and the front ends of linkages 140 remain above arbor 42 at all operable positions of pivot arm assembly 100.

In the exemplary embodiment, linkages 140 extend forward from brace member 116 through one or more holes 148 in the rear of housing 102. Therefore, housing 102 requires no arcuate channels for receiving pins 136, 138 or 144. Furthermore, linkages 140 should not interfere with standard blade guards (not shown) that typically cover the perimeter of the housing and blade. Indeed, a front section of housing 102 may optionally be constructed to telescope around the exterior of the remainder of the housing to allow a user to have greater access to the blade. Alternatively, linkages 140 may be disposed on the exterior of the housing, in which case pivot pin 136 and positioning pin 138 would extend through arcuate channels or similar openings in the housing. Although linkages 140 are depicted as separate structural elements, it will be appreciated that the linkages may be formed as an unitary member with spaced-apart arms, etc.

Figure 6:
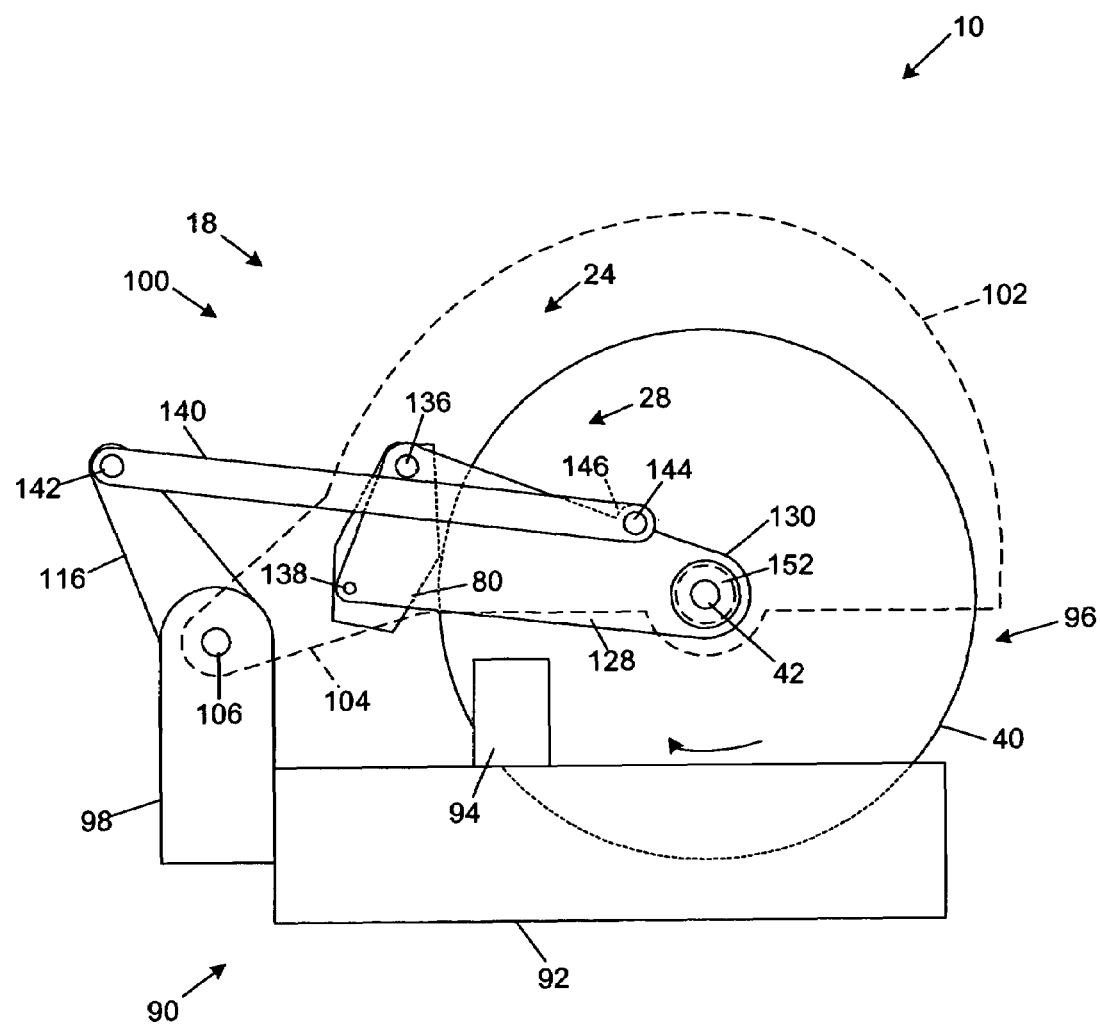
FIG. 6 is a schematic side elevation of another exemplary miter saw having an alternative safety system configured to stop both the rotation and downward movement of the blade.
Figure 7:
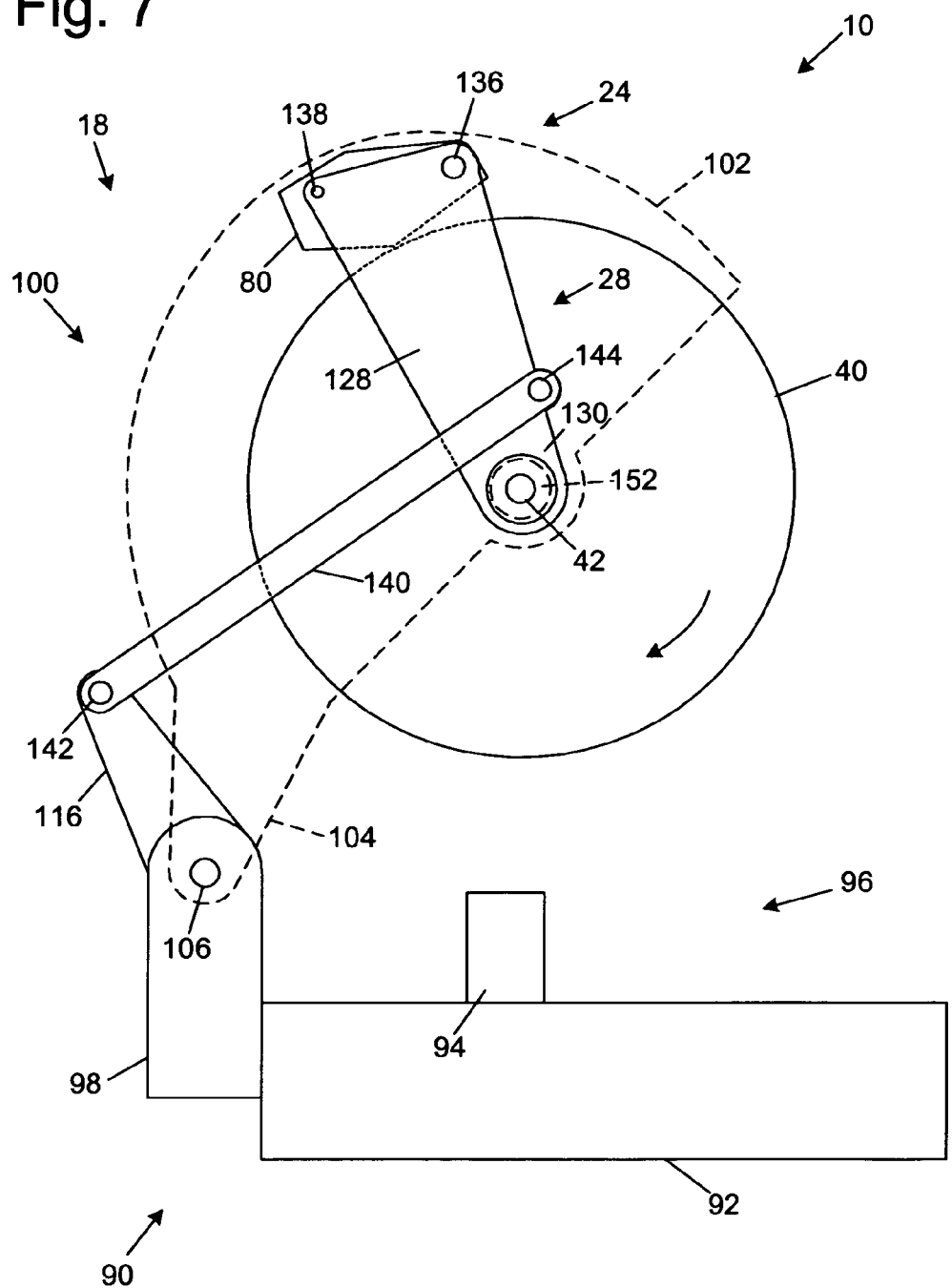
FIG. 7 is similar to FIG. 6 but shows the pivot arm assembly pivoted upward away from the cutting zone.
Figure 8:
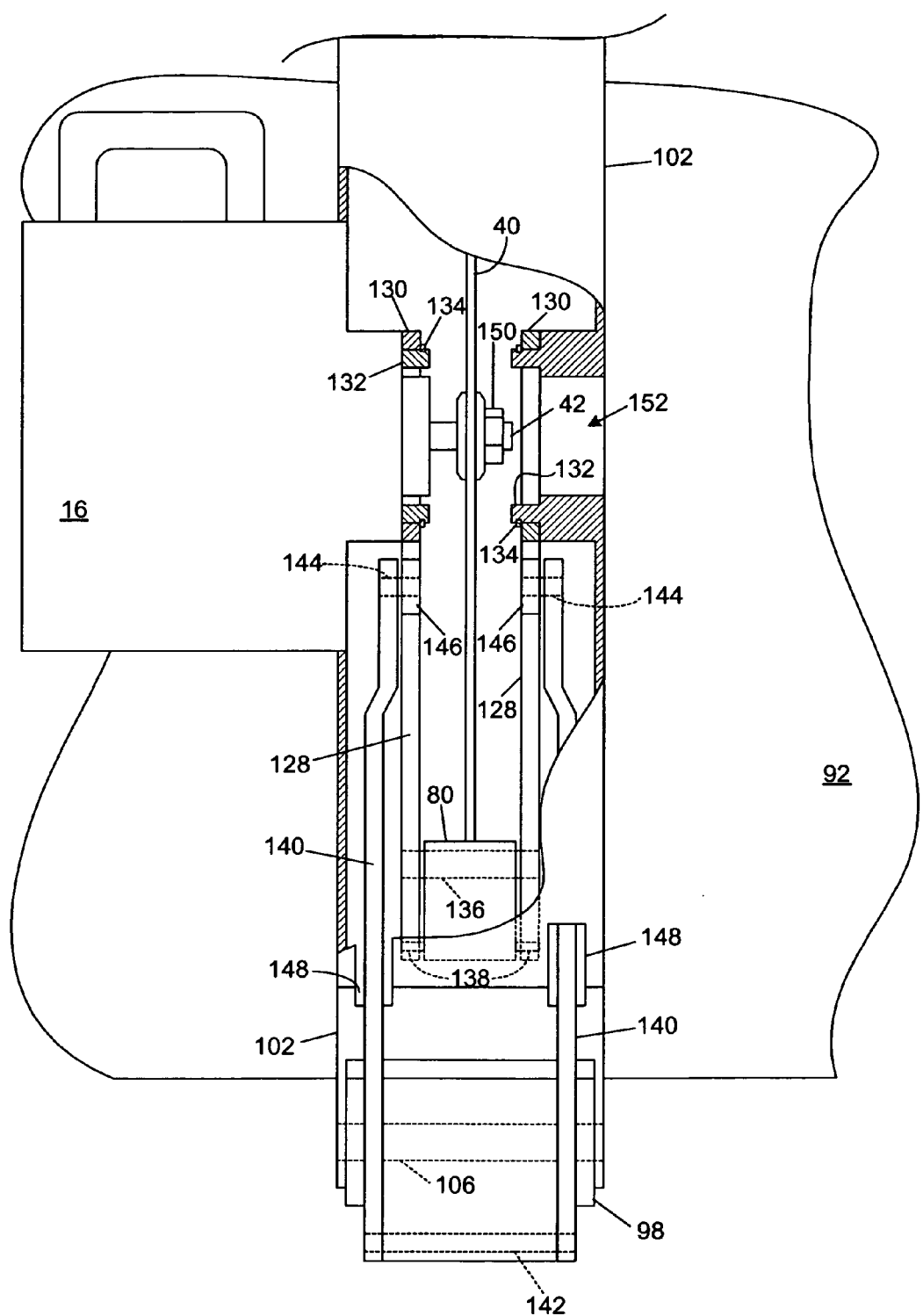
FIG. 8 is a partial top plan view of the miter saw of FIG. 6, with a portion of the housing cut away to show the brake mechanism.

Comparing FIGS. 6 and 7, it can be seen that as pivot arm assembly 100 pivots about pivot coupling 106, linkages 140 cause support arms 128 to pivot about arbor 42 in the opposite direction. Thus, cartridge 80 and brake pawl 60 are counter-pivotally coupled to the pivot arm assembly. As the pivot arm assembly and blade pivot in a clockwise direction (as seen in FIGS. 6 and 7) downward toward cutting zone 96, the cartridge and brake pawl pivot in a counter-clockwise direction about the arbor. Conversely, as the pivot arm assembly and blade pivot in a counter-clockwise direction (as seen in FIGS. 6 and 7) upward away from cutting zone 96, the cartridge and brake pawl pivot in a clockwise direction about the arbor.

The brake pawl (not shown) is mounted on pivot pin 136 to pivot into the teeth of blade 40 upon receipt of an activation signal by the cartridge. When the brake pawl engages the rotating blade, the angular momentum of the blade tends to force the brake pawl to move upward and forward in a clockwise direction (as seen in FIG. 6) about the arbor. Consequently, radial support arms 128 are urged to pivot in a clockwise direction (as seen in FIG. 6) about the arbor. Since the radial support arms are connected to brace member 116 by linkages 140, any clockwise force on the radial support arms is translated into a counter-clockwise force about pivot coupling 106 on housing 102. In other words, when the brake pawl engages the blade, the housing and blade are urged upward away from cutting zone 96.

It will be appreciated that the amount of upward force on the housing will depend on the specific arrangement of brace member 116, linkages 140 and radial support arms 128. The counter-clockwise force on support arms 128 due to any downward momentum and/or force on the pivot arm assembly will have a lesser moment than the clockwise force due to the brake pawl engaging the blade. This is because linkages 140 are coupled to the support arms at a radial position closer to the pivot point of the support arms than is the brake pawl. The ratio of the clockwise force-moment to the counter-clockwise force-moment will depend on the ratio of the distances between pivot pin 136 and arbor 42, and between pivot pins 144 and arbor 42. Additionally, the height of pivot pin 142 above pivot coupling 106, relative to the height of pivot pins 144 above arbor 42 will also effect the ratio of the upward force on the pivot arm assembly due to the brake pawl to any downward momentum and/or force on the pivot arm assembly.

Typically, the height of pivot pin 142 above pivot coupling 106, and the position of pivot pins 144 on support arms 128 are selected to ensure that, under normal operating conditions, any downward movement of the blade toward the cutting zone is stopped when the brake pawl engages the blade. Optionally, the height of pivot pin 142 above pivot coupling 106, and the position of pivot pins 144 on support arms 128 may be selected to ensure that the clockwise force-moment on the support arms is greater than the normal counter-clockwise force-moment when the brake pawl engages the blade. In such case, the blade is pushed or retracted upward and at least partially away from the cutting zone when a dangerous condition is detected such as contact between the user's body and the blade.

Once the brake pawl has engaged and stopped the blade, pivot arm assembly 100 is free to pivot about pivot coupling 106. Housing 102 may include a removable portion through which the cartridge can be replaced. Alternatively, the radial support arms may be uncoupled from brace member 116, as shown in FIG. 9. In the exemplary embodiment, the support arms are uncoupled from the brace member by disconnecting linkages 140 from pivot pin 142. Since the brake pawl usually is wedged onto the blade after being triggered, blade 40 may be rotated until the cartridge is exposed below the housing. Pivot pin 136 and positioning pin 138 may then be removed. Alternatively, positioning pin 138 may be dual spring-loaded pins which can be depressed to disengage the radial support arms. As further alternative, the interior surfaces of radial support arms 128 may include recessed channels 154 adapted to allow pivot pin 136 to slide into place. Position pin(s) 138 may then be installed to hold the cartridge in the operable position relative to the blade. After the used cartridge is replaced with a new cartridge, the cartridge and support arms are pivoted up into the housing and the linkages are reconnected to pivot pin 142. When removing or installing the blade, arbor nut 150 may be accessed through an opening 152 in the housing.

As described above, the present invention provides a miter saw which is substantially safer than existing saws. The miter saw includes a safety system 18 adapted to detect the occurrence of a dangerous condition and stop movement of the blade and/or the pivot arm to prevent serious injury to a user. The safety system may be adapted for use on a variety of saws in addition to miter saws. Several examples of modifications and variations, as well as further detailed descriptions of miter saws and other saws may be found in the following references, the disclosures of which are herein incorporated by reference: PCT Patent Application Ser. No. PCT/US00/26812, filed Sep. 29, 2000; U.S. patent application Ser. No. 09/676,190, filed Sep. 29, 2000; U.S. Provisional Patent Application Ser. No. 60/275,595, filed Mar. 13, 2001; U.S. Provisional Patent Application Ser. No. 60/273,177, filed Mar. 2, 2001; U.S. patent application Ser. No. 10/052,705, filed Jan. 16, 2002; U.S. Provisional Patent Application Ser. No. 60/233,459, filed Sep. 18, 2000; U.S. Provisional Patent Application Ser. No. 60/225,210, filed Aug. 14, 2000; U.S. patent application Ser. No. 09/929,425, filed Aug. 13, 2001; U.S. Provisional Patent Application Ser. No. 60/225,058, filed Aug. 14, 2000; U.S. patent application Ser. No. 09/929,235, filed Aug. 13, 2001; U.S. Provisional Patent Application Ser. No. 60/225,057, filed Aug. 14, 2000; U.S. patent application Ser. No. 09/929,238, filed Aug. 13, 2001; U.S. Provisional Patent Application Ser. No. 60/157,340, filed Oct. 1, 1999; U.S. Provisional Patent Application Ser. No. 60/279,313, filed Mar. 27, 2001; U.S. patent application Ser. No. 10/051,782, filed Jan. 15, 2002; U.S. Provisional Patent Application Ser. No. 60/292,081, filed May 17, 2001; U.S. patent application Ser. No. 09/955,418, filed Sep. 17, 2001; U.S. Provisional Patent Application Ser. No. 60/298,207, filed Jun. 13, 2001; U.S. patent application Ser. No. 10/172,553, filed Jun. 13, 2002; U.S. Provisional Patent Application Ser. No. 60/302,937, filed Jul. 2, 2001; U.S. patent application Ser. No. 10/189,031, filed Jul. 2, 2002;

U.S. Provisional Patent Application Ser. No. 60/302,916, filed Jul. 3, 2001; U.S. patent application Ser. No. 10/189,027, filed Jul. 2, 2002; U.S. Provisional Patent Application Ser. No. 60/307,756, filed Jul. 25, 2001; U.S. patent application Ser. No. 10/202,928, filed Jul. 25, 2002; U.S. Provisional Patent Application Ser. No. 60/324,729, filed Sep. 24, 2001; U.S. Provisional Patent Application Ser. No. 60/335,970, filed Nov. 13, 2001; and U.S. Provisional Patent Application Ser. No. 60/351,797, filed Jan. 25, 2002.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions.

The invention claimed is:

1. A miter saw comprising:
a base adapted to support a workpiece during cutting;
a motor;
a rotatable, circular blade driven by the motor, where the blade includes teeth around its periphery;
a pivot arm assembly associated with the base and supporting the blade above the base, where the pivot arm assembly is adapted to pivot down toward the base to move the blade toward the base to cut a workpiece supported by the base, and where the pivot arm assembly includes a handle adapted to be grasped by a user so that the user can move the blade down toward the base by hand; and
a safety system having a detection subsystem adapted to detect an occurrence of an unsafe condition between a person and the blade, and a reaction subsystem adapted to mitigate the unsafe condition, where the reaction subsystem includes a brake mechanism adjacent the blade, and where at least a part of the brake mechanism is adapted to pivot into the teeth of the blade to engage the blade.

2. The miter saw of claim 1, where the unsafe condition is contact between a person and the blade.

3. The miter saw of claim 1, where the unsafe condition is proximity between a person and the blade.

4. The miter saw of claim 1, where the brake mechanism includes a brake pawl and where the brake pawl is adapted to pivot into the teeth of the blade.

5. The miter saw of claim 4, where the blade is substantially planar, and where the brake pawl is adapted to pivot around an axis generally perpendicular to the plane of the blade.

6. The miter saw of claim 1, where the blade is substantially planar and where at least a part of the brake mechanism is adapted to pivot into the teeth of the blade around an axis generally perpendicular to the plane of the blade.

7. The miter saw of claim 1, further comprising a pivot pin supporting a part of the brake mechanism adapted to pivot into the teeth of the blade.

8. The miter saw of claim 1, further comprising a support arm holding at least a portion of the brake mechanism adjacent the teeth of the blade.

9. The miter saw of claim 1, where the brake mechanism includes a brake pawl adapted to pivot into the teeth of the blade, and further comprising at least one support arm holding the brake pawl adjacent the teeth of the blade.

10. The miter saw of claim 9, where the blade is substantially planar, and where the brake pawl is adapted to pivot around an axis generally perpendicular to the plane of the blade.

11. The miter saw of claim 10, further comprising a pivot pin positioned generally perpendicularly relative to the plane of the blade and supported at least partially by the at least one support arm, and where the brake pawl is adapted to pivot on the pivot pin.

12. A miter saw comprising:
a base adapted to support a workpiece during cutting;
a motor;
a rotatable, circular, generally planar blade driven by the motor, where the blade includes teeth around its periphery;
a pivot arm assembly associated with the base and supporting the blade above the base, where the pivot arm assembly is adapted to pivot down toward the base to move the blade toward the base to cut a workpiece supported by the base, and where the pivot arm assembly includes a handle adapted to be grasped by a user so that the user can move the blade down toward the base by hand; and
a safety system having a detection subsystem adapted to detect an occurrence of an unsafe condition between a person and the blade, and a reaction subsystem adapted to mitigate the unsafe condition, where the reaction subsystem includes a brake configured to pivot into the teeth of the blade around an axis generally perpendicular to the plane of the blade.

13. The miter saw of claim 12, where the unsafe condition is contact between a person and the blade.

14. The miter saw of claim 12, where the unsafe condition is proximity between a person and the blade.

15. The miter saw of claim 12, further comprising a pivot pin supporting the brake.

16. The miter saw of claim 12, further comprising at least one support arm holding the brake adjacent the teeth of the blade.

17. The miter saw of claim 16, further comprising a pivot pin positioned generally perpendicularly relative to the plane of the blade and supported at least partially by the at least one support arm.

18. The miter saw of claim 17, where the brake is adapted to pivot on the pivot pin.

19. A miter saw comprising:
a base adapted to support a workpiece during cutting;
a fence on the base;
a motor;
a rotatable, circular blade driven by the motor, where the blade includes teeth around its periphery;
a pivot arm assembly associated with the base and supporting the blade above the base, where the pivot arm assembly is adapted to pivot down toward the base to move the blade toward the base to cut a workpiece supported by the base, and where the pivot arm assembly includes a handle adapted to be grasped by a user so that the user can move the blade down toward the base by hand; and
a safety system having a detection subsystem adapted to detect an occurrence of an unsafe condition between a person and the blade, and a reaction subsystem adapted to mitigate the unsafe condition, where the reaction subsystem includes brake means for pivoting into the teeth of the blade to stop the rotation of the blade if an unsafe condition is detected by the detection subsystem.

20. The miter saw of claim 19 where the brake means is supported by support arm means for holding the brake means adjacent the teeth of the blade.

* * * * *